United States Patent
Nakagawa et al.

(10) Patent No.: US 9,607,423 B2
(45) Date of Patent: Mar. 28, 2017

(54) SHAPE DATA GENERATION METHOD AND APPARATUS

(71) Applicants: Fujitsu Limited, Kawasaki-shi (JP); The University of Tokyo, Tokyo (JP)

(72) Inventors: Machiko Nakagawa, Kawasaki (JP); Kohei Hatanaka, Fujisawa (JP); Toshiaki Hisada, Tokyo (JP); Seiryo Sugiura, Tokyo (JP); Takumi Washio, Tokyo (JP); Jun-ichi Okada, Tokyo (JP)

(73) Assignees: FUJITSU LIMITED, Kawasaki (JP); The University of Tokyo, Tokyo (JP)

( * ) Notice: Subject to any disclaimer, the term of this patent is extended or adjusted under 35 U.S.C. 154(b) by 96 days.

(21) Appl. No.: 14/604,258

(22) Filed: Jan. 23, 2015

(65) Prior Publication Data
US 2015/0131914 A1    May 14, 2015

Related U.S. Application Data

(63) Continuation of application No. PCT/JP2012/068634, filed on Jul. 23, 2012.

(51) Int. Cl.
*G06T 15/00* (2011.01)
*G06T 19/20* (2011.01)
(Continued)

(52) U.S. Cl.
CPC .............. *G06T 15/00* (2013.01); *G06K 9/52* (2013.01); *G06T 3/0056* (2013.01);
(Continued)

(58) Field of Classification Search
None
See application file for complete search history.

(56) References Cited

U.S. PATENT DOCUMENTS 7,557,804 B1 * 7/2009 McDaniel .............. G06T 19/20
                                                        345/419
7,620,226 B2 * 11/2009 Unal .................... G06T 7/0083
                                                        382/128
(Continued)

FOREIGN PATENT DOCUMENTS

JP     2001-034774 A    2/2001
JP     2002-329216 A    11/2002
(Continued)

OTHER PUBLICATIONS

Huang WC, Goldgof DB. Adaptive-size meshes for rigid and nonrigid shape analysis and synthesis. IEEE Transactions on Pattern Analysis and Machine Intelligence. Jun. 1993;15(6):611-6.*
(Continued)

*Primary Examiner* — Michelle Hausmann
(74) *Attorney, Agent, or Firm* — Oblon, McClelland, Maier & Neustadt, L.L.P.

(57) ABSTRACT

This shape data generation method include: setting an input shape that has a simple shape that has a same topology as the target shape for a target shape that is a shape of a transformation target identified from image data; identifying first vertices that satisfy a predetermined condition including a first condition that a normal line of a certain vertex of the plural vertices crosses with the target shape, among plural vertices of the input shape; transforming the input shape so that a first vertex is moved in a direction of a normal line of the first vertex by a first distance that is shorter than a distance up to the target shape; and performing the identifying and the transforming a predetermined number of times while changing the input shape after the transforming as the input shape to be processed.

7 Claims, 30 Drawing Sheets

(51) Int. Cl.
*G06T 3/00* (2006.01)
*G06T 7/00* (2006.01)
*G06K 9/52* (2006.01)

(52) U.S. Cl.
CPC .......... *G06T 3/0093* (2013.01); *G06T 7/0012* (2013.01); *G06T 7/0083* (2013.01); *G06T 7/0089* (2013.01); *G06T 19/20* (2013.01); *G06T 2207/10072* (2013.01); *G06T 2207/30048* (2013.01); *G06T 2207/30104* (2013.01); *G06T 2219/2021* (2013.01)

(56) References Cited

U.S. PATENT DOCUMENTS

| | | | | |
|---|---|---|---|---|
| 8,165,370 | B2* | 4/2012 | Inoue | A61B 1/04 382/128 |
| 8,639,477 | B2* | 1/2014 | Chelnokov | A61C 13/0004 433/213 |
| 8,768,018 | B2* | 7/2014 | Ishikawa | G06T 3/0093 382/128 |
| 2002/0184470 | A1* | 12/2002 | Weese | G06T 7/0012 712/1 |
| 2004/0109595 | A1* | 6/2004 | Luo | G06K 9/38 382/132 |
| 2006/0093217 | A1* | 5/2006 | Hong | G06K 9/00201 382/181 |
| 2006/0094951 | A1 | 5/2006 | Dean et al. | |
| 2008/0123927 | A1* | 5/2008 | Miga | G06T 7/0032 382/131 |
| 2010/0156936 | A1* | 6/2010 | Maeda | G06F 17/30259 345/647 |
| 2011/0282473 | A1* | 11/2011 | Pavlovskaia | A61B 5/055 700/98 |
| 2012/0253170 | A1* | 10/2012 | Kim | A61B 34/10 600/410 |

FOREIGN PATENT DOCUMENTS

| | | |
|---|---|---|
| JP | 2007-098028 A | 4/2007 |
| JP | 2007-159927 A | 6/2007 |
| JP | 2010-061431 A | 3/2010 |
| JP | 2011-224143 A | 11/2011 |
| WO | WO 2004/110309 A2 | 12/2004 |

OTHER PUBLICATIONS

JP 2010244178 A Machine translation.*
International Search Report mailed Aug. 28, 2012 for PCT/JP2012/068634 filed Jul. 23, 2012 with English Translation.
Bookstein Fred L., "Principal Warps: Thin-Plate Splines and the Decomposition of Deformations", IEEE Transactions on Pattern Analysis and Machine Intelligence, vol. 11, No. 6, pp. 567-585, Jun. 1989.
Sorkine O. et al., "Laplacian Surface Editing", SGP '04 Proceedings of the 2004 Eurographics/ACM SIGGRAPH symposium on Geometry processing, pp. 175-184, 2004.
Extended Search Report issued Dec. 9, 2015 in European Patent Application No. 12881557.8.
I-Cheng Yeh, et al., "Template-Based 3D Model Fitting Using Dual-Domain Relaxation", IEEE Transactions on Visualization and Computer Graphics, vol. 17, No. 8, Aug. 1, 2011, XP011373284, pp. 1178-1190.
Yefeng Zheng, et al., "Four-Chamber Heart Modeling and Automatic Segmentation for 3-D Cardiac CT Volumes Using Marginal Space Learning and Steerable Features", IEEE Transactions on Medical Imaging, vol. 27, No. 11, Nov. 1, 2008, XP011233214, pp. 1668-1681.

* cited by examiner

US 9,607,423 B2

SHAPE DATA GENERATION METHOD AND APPARATUS

CROSS-REFERENCE TO RELATED APPLICATIONS

This application is a continuing application, filed under 35 U.S.C. section 111(a), of International Application PCT/JP2012/068634, filed on Jul. 23, 2012, the entire contents of which are incorporated herein by reference.

FIELD

This technique relates to a shape data generation technique.

BACKGROUND

Recently, along with the enhancement of the computational capability of a computer by High Performance Computing technology, biological simulation to reproduce the movement of an organ such as a heart of the human being is focused on. In order to perform this biological simulation, shape data for the three-dimensional organ having complex inner information or the like is used in some cases.

In order to generate the shape data for the organ or the like, a method is known in which a standard shape that represents the organ is transformed to a shape of an organ represented by image data.

In this method, for example, the transformation is performed by correlating points in the standard shape with points in a target shape. However, there is a problem that the transformation is not appropriately performed when the points are not appropriately correlated.

Moreover, in case of the organ such as the heart, there may be large differences between the standard shape and the target shape of an individual patient. Therefore, because of the difference in the positions of the blood vessels or the like, it is recognized that there is a case where it is impossible to transform the standard shape with high accuracy.

Patent Document 1: Japanese Laid-open Patent Publication No. 2002-329216
Patent Document 2: Japanese Laid-open Patent Publication No. 2010-61431
Patent Document 3: Japanese Laid-open Patent Publication No. 2001-34774
Patent Document 4: Japanese Laid-open Patent Publication No. 2007-98028
Non-Patent Document 1: "Principal Warps: Thin-Plate Splines and the Decomposition of Deformations", IEEE TRANSACTIONS ON PATTERN ANALYSIS AND MACHINE INTELLIGENCE, Fred L. Bookstein, VOL. 11, NO. 6, June 1989
Non-Patent Document 2: "Laplacian surface editing", SGP '04 Proceedings of the 2004 Eurographics/ACM SIGGRAPH symposium on Geometry processing, O. Sorkine, Tel Aviv University, D. Cohen-Or, TelAvivUniversity, Y. Lipman, TelAvivUniversity, M. Alexa, Darmstadt University of Technology, C. Roessi, Max-Planck Institut fuer Informatik, Saarbruecken, H.-P. Seidel, Max-Planck Institut fuer Informatik, Saarbruecken

SUMMARY

A shape data generation method relating to one aspect of this technique includes: (A) setting an input shape for a target shape that is a shape of a transformation target identified from image data, wherein the input shape has a simple shape that has a same topology as the target shape; (B) identifying first vertices that satisfy a predetermined condition among plural vertices of the input shape, wherein the predetermined condition includes a first condition that a normal line of a certain vertex of the plural vertices crosses with the target shape; (C) first transforming the input shape so that a first vertex is moved in a direction of a normal line of the first vertex by a first distance that is shorter than a distance up to the target shape; and (D) performing the identifying and the first transforming a predetermined number of times while changing the input shape after the first transforming as the input shape to be processed.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Embodiment 1

Figure 1:
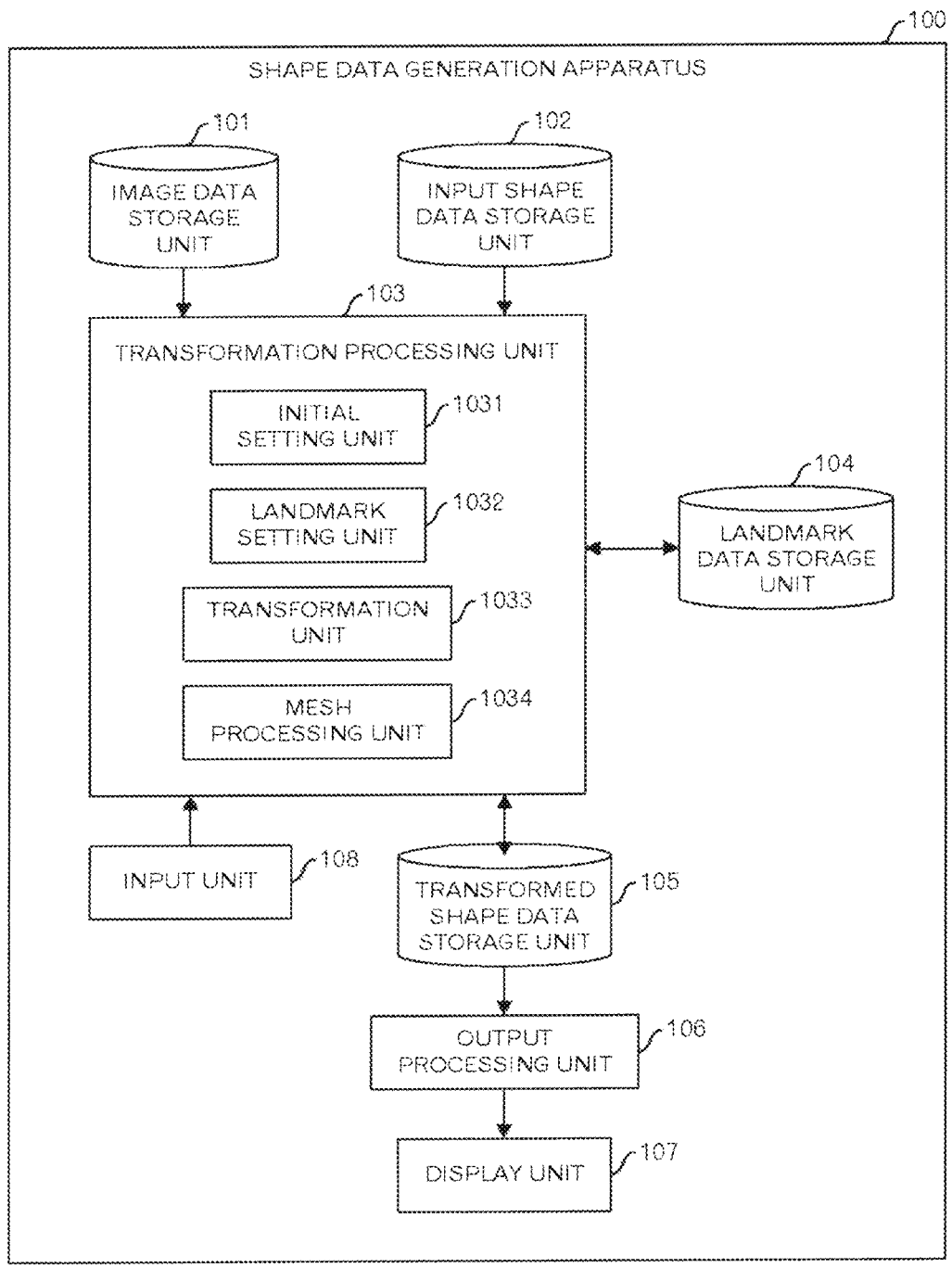
FIG. 1 is a functional block diagram of a shape data generation apparatus relating to a first embodiment.

FIG. 1 illustrates a functional block diagram of a shape data generation apparatus relating to a first embodiment of this technique. The shape data generation apparatus 100 has an image data storage unit 101, an input shape data storage unit 102, a transformation processing unit 103, a landmark data storage unit 104, a transformed shape data storage unit 105, an output processing unit 106, a display unit 107 and an input unit 108.

The transformation processing unit 103 has an initial setting unit 1031, a landmark setting unit 1032, a transformation unit 1033 and a mesh processing unit 1034.

Figure 2:
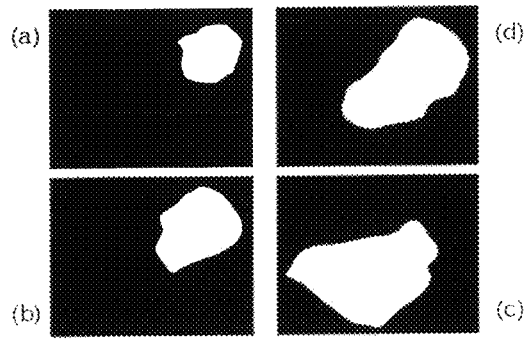
FIG. 2 is a diagram depicting an example of segment image data.

Segment image data is stored in the image data storage unit 101. The segment image data is obtained by performing a processing for each portion to paint the inside of the boundary of the portion with a different brightness value for a Computed Tomography (CT) image of the heart of a specific patient or the like. For example, by accumulating the segment image data as schematically illustrated in FIG. 2, the three-dimensional data of the target shape, which is a shape that is a target of the transformation, is obtained. In an example of FIG. 2, the images are accumulated in order of (a), (b), (c) and (d) from the bottom.

Figure 3:
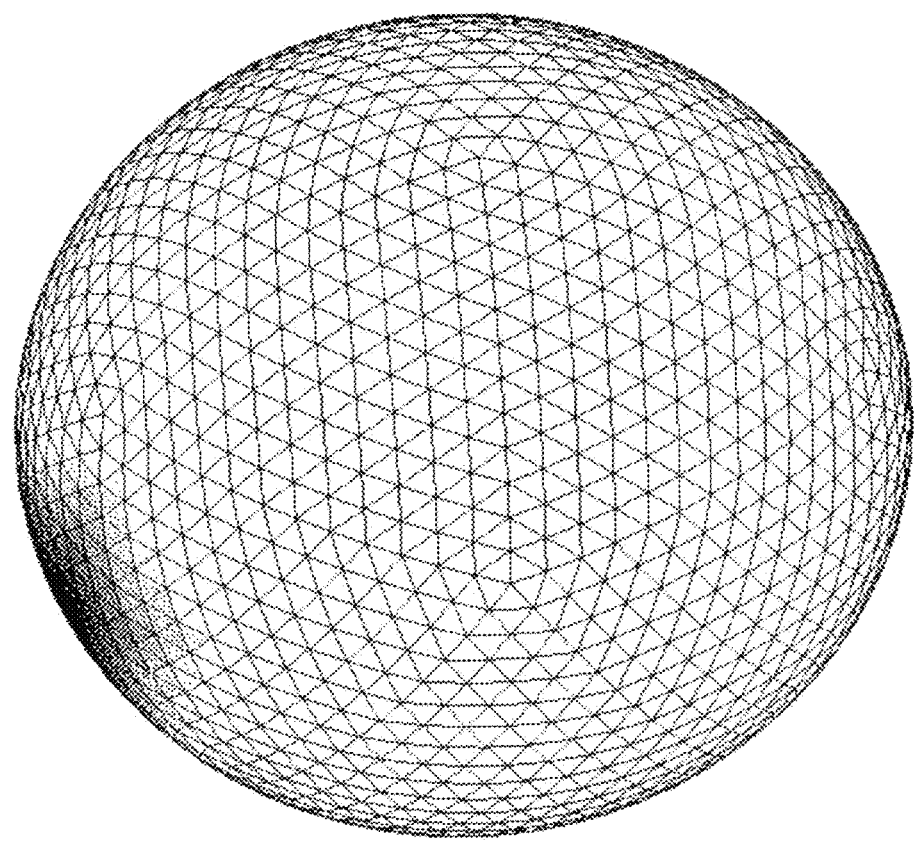
FIG. 3 is a diagram depicting a sphere as an example of an input shape.

The three-dimensional data of an input shape to be transformed is stored in the input shape data storage unit 102. In this embodiment, the standard shape of the heart or the like is not used as the input shape, and a most uncharacteristic shape that has a topology similar to the shape to be represented is used. Such an input shape is a spherical shape in case of the three-dimensional closed surface, and is a discoid shape in case of the three-dimensional surface with an opening. In this embodiment, an example that the target shape is the three-dimensional closed surface will be explained. Therefore, the input shape is a sphere. For example, a sphere whose surface is meshed is used as illustrated in FIG. 3.

The transformation processing unit 103 performs a processing to transform the input shape to the target shape. More specifically, the initial setting unit 1031 of the transformation processing unit 103 performs a processing to place the input shape for the target shape. The landmark setting unit 1032 performs a processing to set landmarks for the input shape or transformed input shape. The transformation unit 1033 performs a transformation processing by TPS Warp. As for the processing by the TPS Warp, Fred L. Bookstein, "Principal Warps: Thin-Plate Splines and the Decomposition of Deformations", IEEE TRANSACTIONS ON PATTERN ANALYSIS AND MACHINE INTELLIGENCE, VOL. 11, NO. 6, PP. 567-585, June 1989 describes its details, therefore, the detailed explanation is omitted here. This document is incorporated herein by reference.

The mesh processing unit 1034 performs a remeshing processing according to the Delaunay triangle-division technique. Because the Delaunay triangle-division is well-known, the detailed explanation is omitted.

The landmark data storage unit 104 stores data of the landmarks, which are set by the landmark setting unit 1032 and used in the transformation processing by the transformation unit 1033.

The transformed shape data storage unit 105 stores shape data during the transformation processing and shape data after the completion of the transformation processing. The output processing unit 106 generates data to display, on the display unit 107, shape data after the completion of the transformation processing, which is stored in the transformed shape data storage unit 105, and outputs the generated data to the display unit 107.

The input unit 108 accepts instructions or the like for the transformation processing unit 103 from a user, and outputs the instructions or the like to the transformation processing unit 103.

Next, processing contents of the shape data generation apparatus 100 will be explained by using FIGS. 4 to 21.

Figure 4:
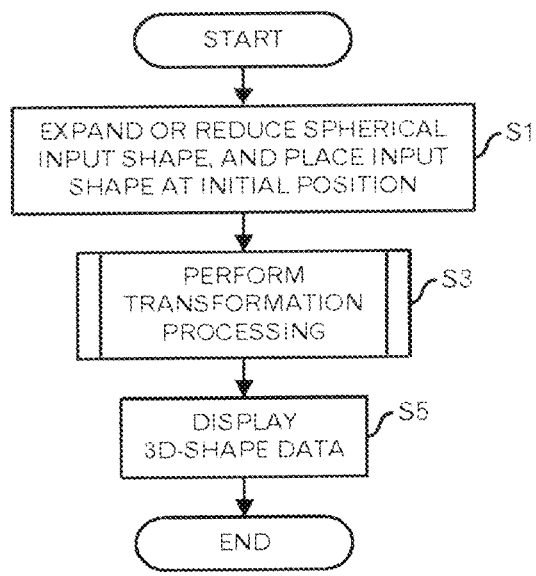
FIG. 4 is a diagram depicting a main processing flow in the first embodiment.

For example, when an instruction that represents that the target shape is a three-dimensional closed surface such as a right atrium is accepted via the input unit 108 from a user, the initial setting unit 1031 of the transformation processing unit 103 identifies the target shape from the image data stored in the image data storage unit 101, reads out data of the spherical input shape from the input shape data storage unit 102, expands or reduces the input shape so as to match the input shape with the target shape, and places the input shape so that the center of gravity of the input shape is identical to the center of gravity of the target shape (FIG. 4: step S1).

More specifically, the minimum hexahedron (i.e. bounding box) that encloses the target shape is identified, and the average value of the lengths of the edges in x, y and z-axes of the bounding box is calculated. Then, the sphere that is the input shape is expanded or reduced so that the expanded or reduced sphere is included in a cube whose edge has the length of that average. However, scale conversion with the expansion or reduction ratios that are different in three directions may be performed for the sphere so that the expanded or reduced sphere is included in the bounding box.

Figure 5:
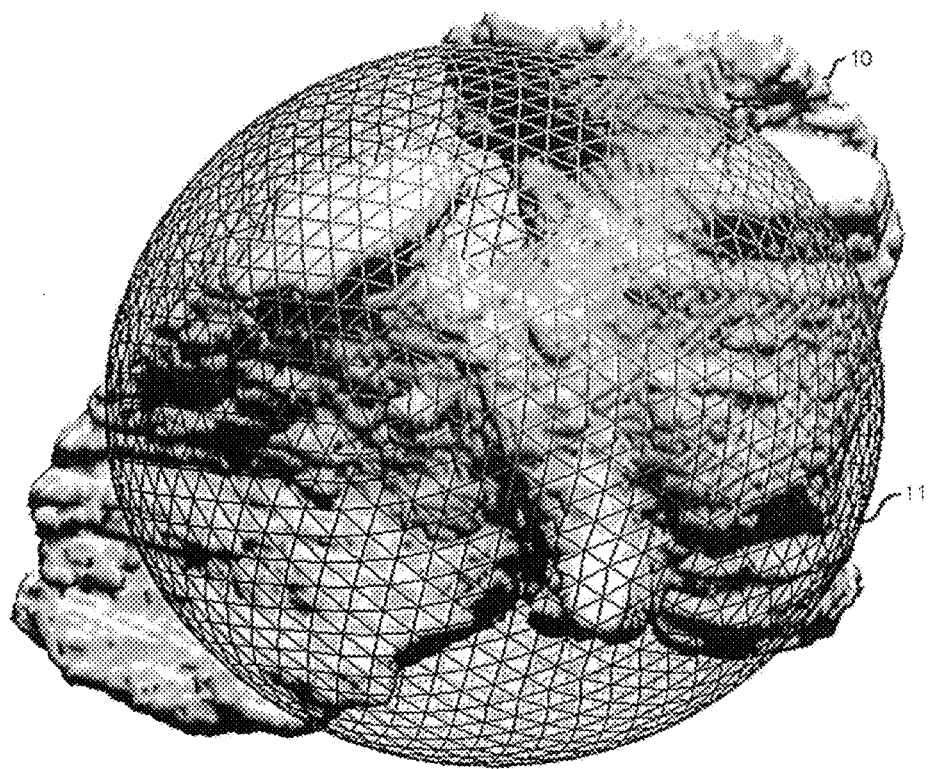
FIG. 5 is a diagram depicting initial arrangement of the input shape.

When the sphere is expanded or reduced equally in each direction, the initial arrangement is made as illustrated in FIG. 5, for example. FIG. 5 illustrates a state that a sphere 11 is placed for the target shape 10 that is the right atrium so that their centers of gravity are identical.

Next, the transformation processing unit 103 performs a transformation processing, and stores the shape data after the completion of the transformation processing in the transformed shape data storage unit 105 (step S3). The transformation processing will be explained in detail later.

After that, the output processing unit 106 performs a processing to display the three-dimensional shape data after the completion of the transformation processing on the display unit 107 (step S5).

Next the transformation processing will be explained by using FIGS. 6 to 21.

Figure 6:
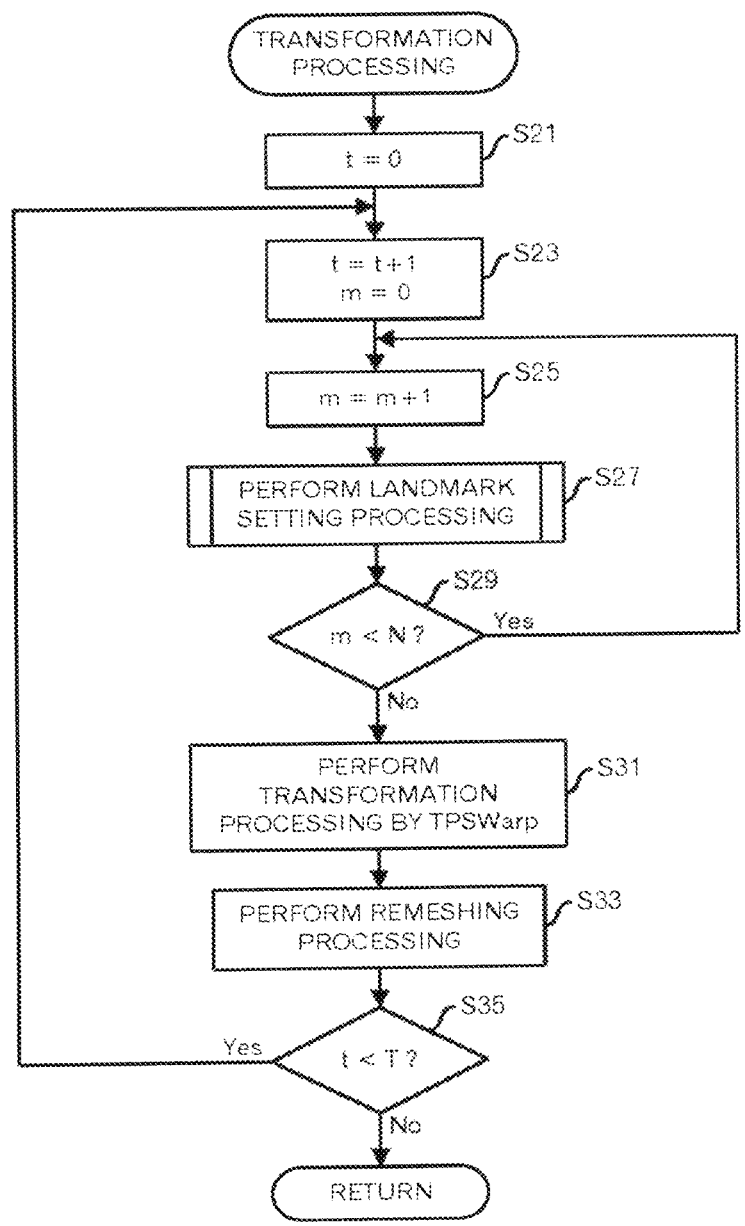
FIG. 6 is a diagram depicting a processing flow of a transformation processing.

Firstly, the transformation processing unit 103 sets t=0 as the initial value of a variable t to count the number of times of the transformation (FIG. 6: step S21). Next, the transformation processing unit 103 counts the number of times of the transformation by incrementing the variable t by "1", and sets m=0 as the initial value of a variable m (step S23). m is a variable to count the number of vertices that have been processed.

Then, the transformation processing unit 103 increments the variable m by "1" (step S25), and the landmark setting unit 1032 of the transformation processing unit 103 performs a landmark setting processing (step S27). The landmark setting processing will be explained by using FIGS. 7 to 13.

Figure 7:
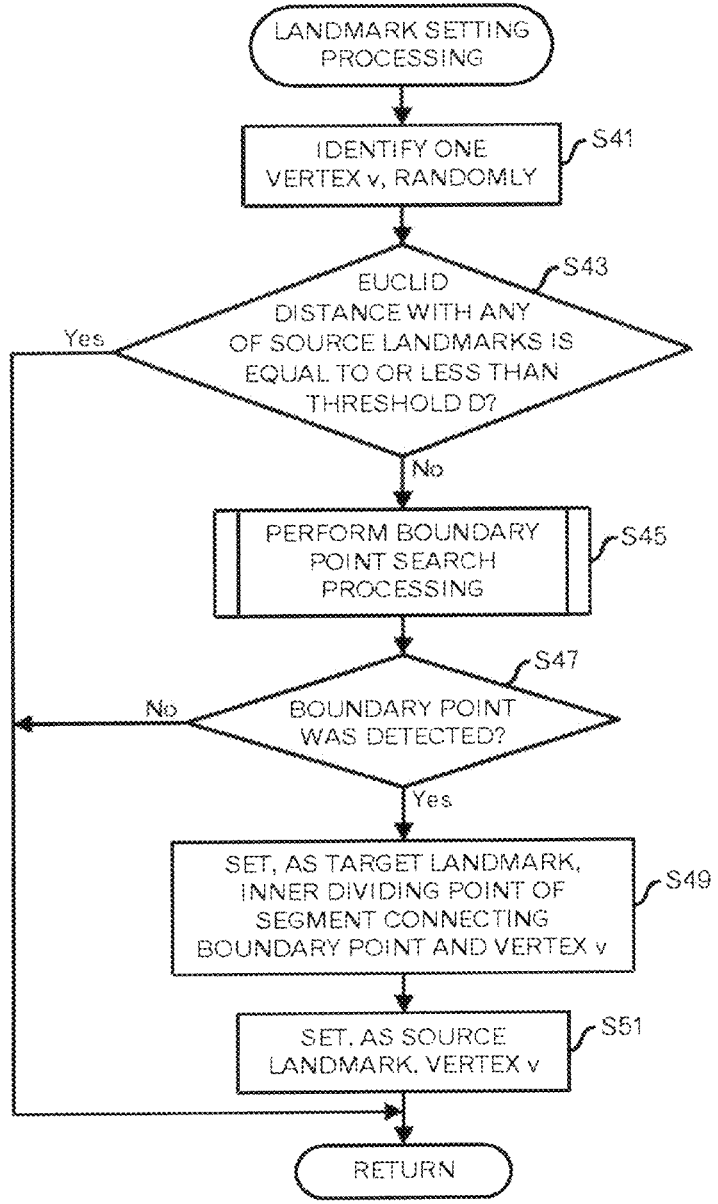
FIG. 7 is a diagram depicting a processing flow of a landmark setting processing.

Firstly, the landmark setting unit 1032 randomly identifies one vertex v from data of the input shape or the input shape after the previous transformation (FIG. 7: step S41). Because there is no meaning for selection of the same vertex, an unselected vertex is selected while the value of t does not change, for example.

Then, the landmark setting unit 1032 respectively calculates a Euclid distance between each source landmark, which is stored in the landmark data storage unit 104, and the vertex v. In addition, the landmark setting unit 1032 determines whether or not the minimum distance among the Euclid distances between the vertex v and respective source landmarks is equal to or less than a threshold D (step S43). The step S43 is a processing performed in order to locate the vertices v in the input shape or the input shape after the previous trans format ion, evenly as much as possible. It is determined at the step S43 whether or not a following expression is satisfied.

$$\min_i d(v, v_i) \leq D$$

Here, $d(v, v_i)$ represents a Euclid distance between a point v and a point $v_i$. $v_i$ is a source landmark. However, because no source landmark is set initially, it is assumed that the Euclid distance exceeds the threshold D.

When it is determined that the minimum distance among the Euclid distances between the vertex v and the respective source landmarks is equal to or less than the threshold D (step S43: Yes route), the processing returns to the calling-source processing. On the other hand, when it is determined that the minimum distance among the Euclid distances between the vertex v and the respective source landmarks is greater than the threshold D (step S43: No route), the landmark setting unit 1032 performs a boundary point search processing (step S45). The boundary point search processing will be explained by using FIGS. 8 to 13.

Figure 8:
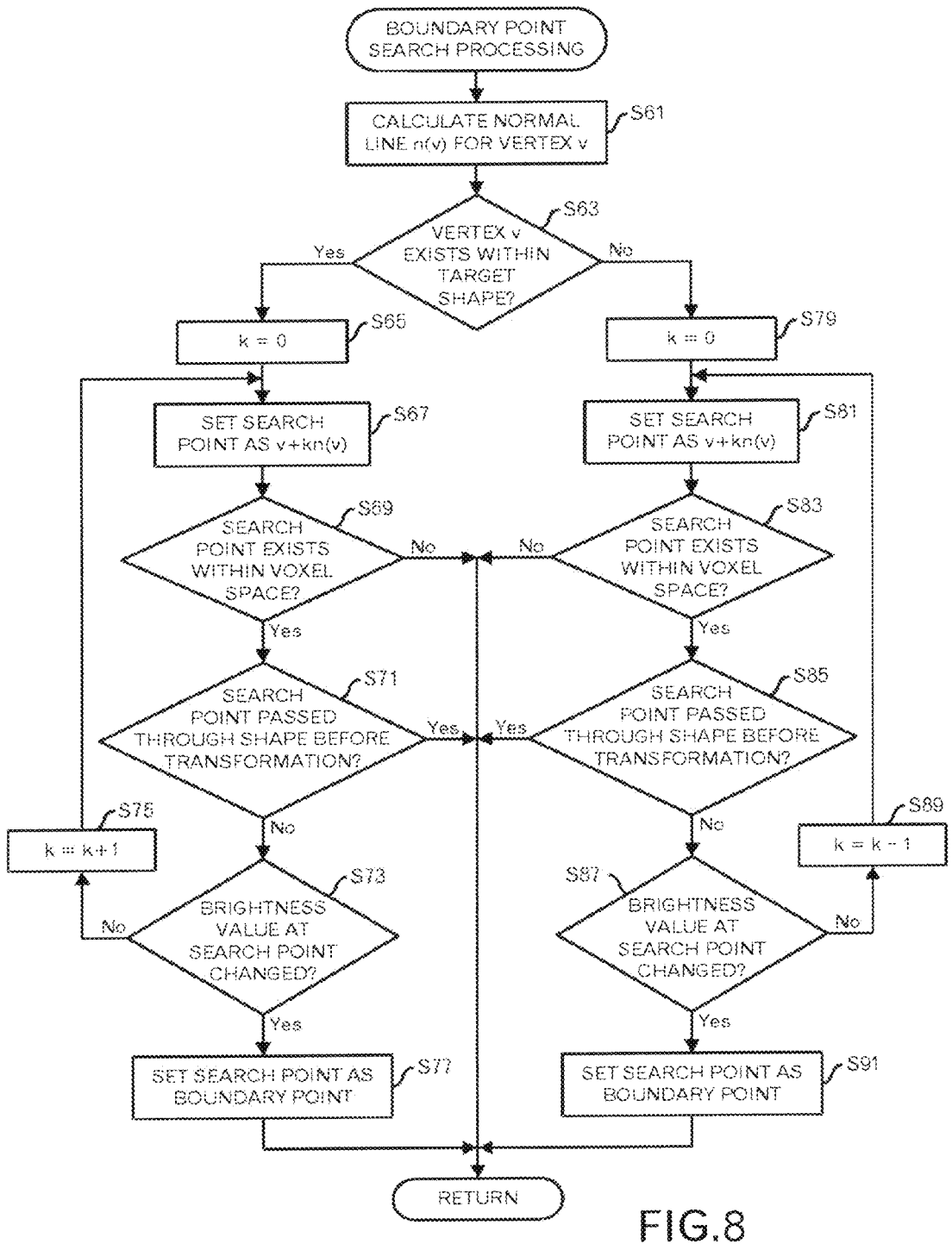
FIG. 8 is a diagram depicting a processing flow of a boundary point search processing.

Firstly, the landmark setting unit 1032 calculates a unit normal vector n(v) of the vertex v (FIG. 8: step S61). Here, n(v) is a unit normal vector against a surface H at the vertex v (∈H). The unit normal vector is a normal vector having the length "1". H(⊂V) represents a shape surface of the input shape or the input shape after the previous transformation, and V(⊂$R^3$) represents a voxel space identified by the segment image data. Moreover, $R^3$ represents a real number space. Here, in order to simplify the explanation, the value of the voxel in the segment image data is any one of two values "0" and "1", however, may be any value of values other than 0 and 1, or may be any value of two or more values. Moreover, the voxel is a minimum cubic unit (i.e. regular grid) in the 3D expression of the digital data.

Moreover, the landmark setting unit 1032 determines whether or not the vertex v exists in the inside of the target shape (step S63). It is determined at the step S63 that a following expression is satisfied.

$$f(v) > 0$$

Here, the mapping f: V→$R^3$ from the voxel space V to the real number space $R^3$ is defined as follows: According to this mapping f, elements of the segment image data included in the voxel space V are correlated with the real number space $R^3$.

$$f(p) = I$$

Here, I is a brightness value of a voxel that includes a point p (∈V).

Figure 9:
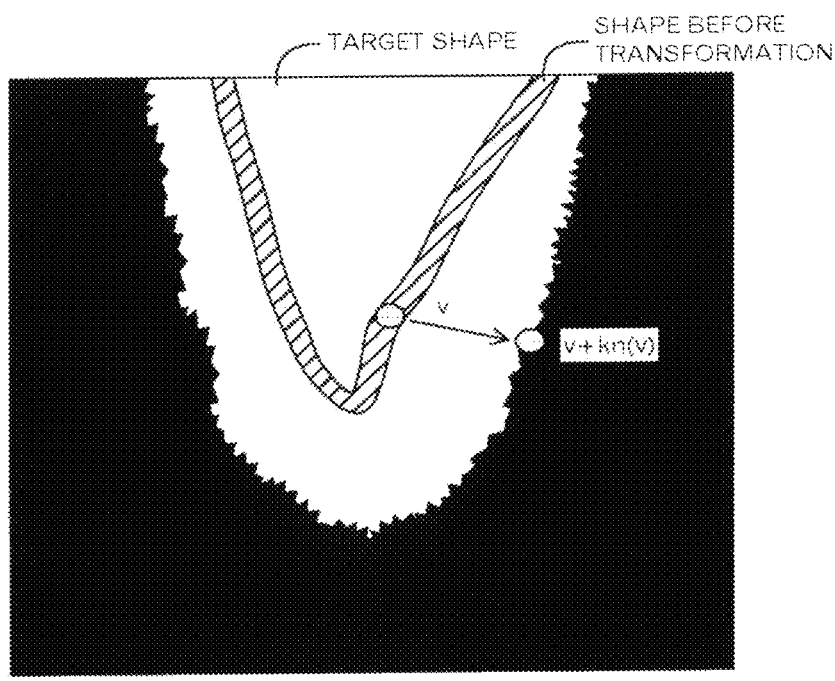
FIG. 9 is a diagram to explain a relationship between a position of a vertex v and a brightness value.
Figure 10:
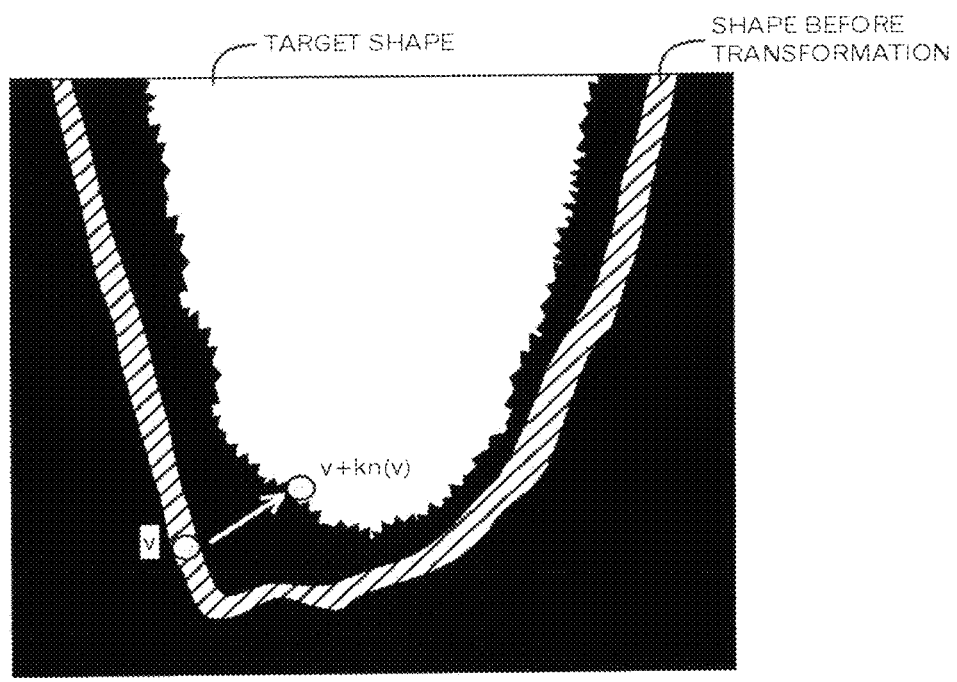
FIG. 10 is a diagram to explain the relationship between the position of the vertex v and the brightness value.

The processing at the step S63 will be explained by using FIGS. 9 and 10. As illustrated in FIG. 9, when the brightness value f(v) in the voxel space, which corresponds to the vertex v, is greater than 0, the vertex v exists within the target shape. Therefore, by performing setting to increment a coefficient k one-by-one in the processing of step S75, which will be explained later, the boundary point is searched for in a direction from the inside of the target shape to the outside. On the other hand, as illustrated in FIG. 10, when the brightness value f(v) in the voxel space, which corresponds to the vertex v, becomes "0", the vertex v exists outside the target shape. Therefore, by performing setting to decrement the coefficient k one-by-one in the processing of step S89, which will be explained later, the boundary point is searched for in a direction from the outside of the target shape to the inside.

Then, when it is determined that the vertex v exists within the target shape (step S63: Yes route), the landmark setting unit 1032 sets k=0 for the coefficient k (step S65). Moreover, the landmark setting unit 1032 sets a point for which it is determined whether it is the boundary point (hereinafter, referred to "search point") as follows: (step S67).

$$v + kn(v)$$

Then, the landmark setting unit 1032 determines whether or not the search point exists within the voxel space identified from the segment image data (step S69). It is determined at the step S69 whether or not a following expression is satisfied.

$$v + kn(v) \in V$$

When it is determined that the search point does not exist within the voxel space identified from the segment image data (step S69: No route), the processing returns to the calling-source processing. This is because it is possible to determine that there is no cross point between the normal of the vertex v and the target shape, because the search point goes out of the voxel space.

On the other hand, when it is determined that the search point exists within the voxel space identified from the segment image data (step S69: Yes route), the landmark setting unit 1032 determines whether or not the search point passed through the shape before the transformation (i.e. input shape or input shape after the previous transformation) (step S71). It is determined at the step S71 whether or not a following expression is satisfied.

(g(v),g(v+kn(v)))<0

Here, the mapping g: V→R$^3$ is defined as follows: By this mapping g, elements of the segment image data included in the voxel space V are correlated with the real number space R$^3$.

$$g(p) = \begin{cases} n(p) & (\text{if } p \in H) \\ 0 & (\text{if } p \notin H) \end{cases}$$

Here, note that the restriction g|$_H$ of the mapping g becomes n (v).

Figure 11:
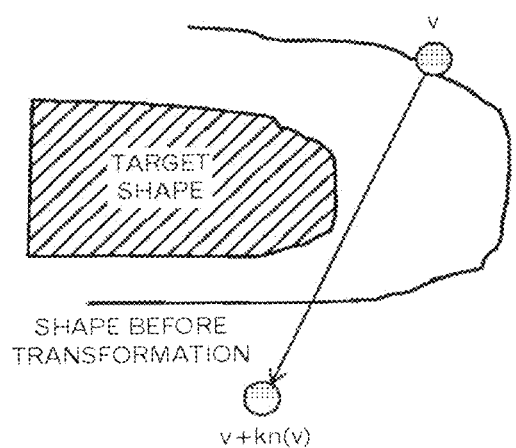
FIG. 11 is a diagram depicting an example of a case where the search point passes through a shape before the transformation.
Figure 12:
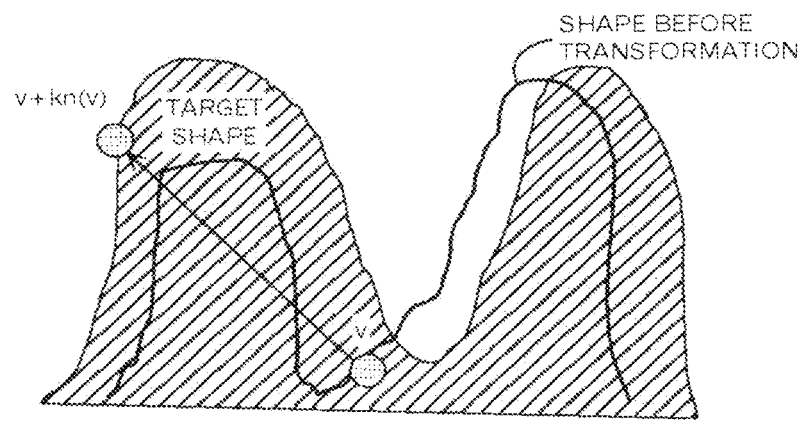
FIG. 12 is a diagram depicting an example of the case where the search point passes through the shape before the transformation.

The processing of the step S71 will be explained by using FIGS. 11 and 12. When the search point passed through the shape before the transformation (i.e. input shape or input shape after the previous transformation) before the search point reaches the boundary point, there is a possibility that the search for the boundary point is not appropriately performed. As for such a case where the search point passed through the shape before the transformation before the search point reaches the boundary point, a case as illustrated in FIG. 11 and a case as illustrated in FIG. 12 are considered, for example. In other words, a case is considered that no boundary point exists in the search direction depending on the transforming degree against the target shape. In either of the cases, there is a possibility that the boundary point cannot be detected or the boundary point is detected at an unappropriate position. Therefore, at the step S71, the inner product between the normal vector for the vertex v and the normal vector for the search point is calculated, and when the inner product is less than "0" (i.e. an angle between the normal vectors is greater than 90 degrees), it is determined that the search point passed through the shape before the transformation.

Returning to the explanation of FIG. 8, when it is determined that the search point passed through the shape before the transformation (step S71: Yes route), it is impossible to detect any boundary point, therefore, the processing returns to the calling-source processing. On the other hand, when it is determined that the search point does not pass through the shape before the transformation (step S71: No route), the landmark setting unit 1032 compares the brightness value in the voxel space, which corresponds to the search point, with the brightness value in the voxel space, which corresponds to the vertex v, and determines whether or not the brightness value is changed significantly, in other words, the brightness value is changed by a permissible value or more (step S73). It is determined at the step S73 whether or not a following expression is satisfied.

f(v)≠f(v+kn(v))

Then, when it is determined that the brightness value does not change significantly (step S73: No route), the landmark setting unit 1032 increments coefficient k by "1" (step S75), and the processing returns to the processing of the step S67.

Figure 13:
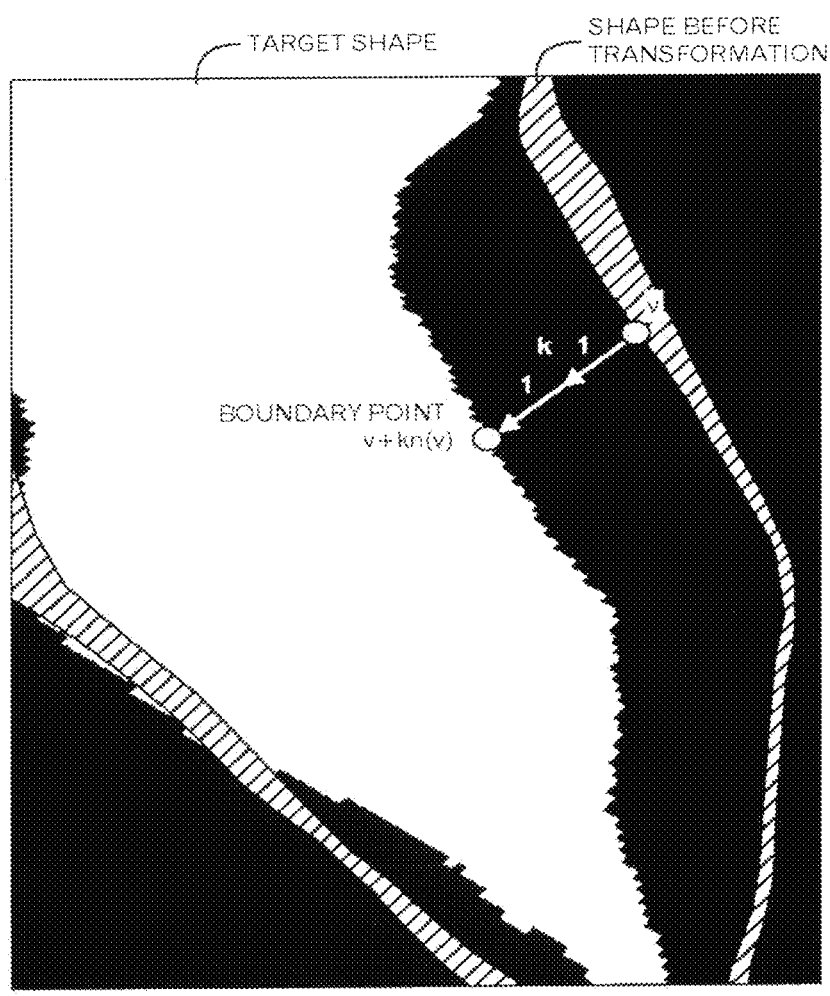
FIG. 13 is a diagram to explain search for the boundary points.

By performing the aforementioned processing, as illustrated in FIG. 13, while moving the search point by one voxel in the normal direction from the vertex v, it is possible to determine whether or not the boundary point exists.

On the other hand, when it is determined that the brightness value changed significantly (step S73: Yes route), the landmark setting unit 1032 sets the search point as the boundary point (step S77). At the step S77, data of the search point (for example, the value of k) is stored in a memory device such as a main memory. Then, the processing returns to the calling-source processing.

On the other hand, a processing performed when it is determined at the step S63 that the vertex v exists outside the target shape (step S63: No route) will be explained. This processing is different from the aforementioned processing only in the search direction. Therefore, the basic processing contents are as described above. In other words, a processing of step S79 is similar to the processing of the step S65, a processing of step S81 is similar to the processing of the step S67, a processing of step S83 is similar to the processing of the step S69, a processing of step S85 is similar to the processing of step S71 and a processing of step S87 is similar to the step S73. Therefore, the detailed explanation for the processing of the steps S79 to S87 is omitted.

Then, the landmark setting unit 1032 decrements the coefficient k by "1" (step S89), and the processing returns to the step S81. Thus, the search point is moved one voxel in the normal direction from the outside of the target shape to the inside. Moreover, the processing of step S91 is similar to the processing of the step S77.

By performing the aforementioned processing, it becomes possible to detect the cross point between the normal line for the vertex v and the target shape (i.e. boundary point).

Returning to the explanation of FIG. 7, the landmark setting unit 1032 determines whether or not the boundary point was detected in the boundary point search processing (step S47). When it is determined that the boundary point was not detected (step S47: No route), the processing returns to the calling-source processing in order to process a next vertex.

On the other hand, when it is determined that the boundary point is detected (step S47: Yes route), the landmark setting unit 1032 sets an inner dividing point of a segment connecting between the vertex v and the boundary point v+kn(v) as a target landmark (step S49). More specifically, a following point is set as the target landmark.

$$v + \frac{t}{T}kn(v)$$

Then, the landmark setting unit 1032 sets the vertex v as the source landmark (step S51). As for the source landmark, data of a vertex identifier is stored in the landmark data storage unit 104, and as for the corresponding target landmark, coordinate data is stored in the landmark data storage unit 104. The coordinate data of the source landmark is read out and used from the input shape data storage unit 102 and by using an identifier of the source landmark in case where the input shape is processed, and is read out and used from the transformed shape data storage unit 105 in case where the input shape after the previous transformation is processed. The source landmark is used at the step S43, however, the source landmark that was set in the past is to be processed. A pair of the source landmark and the target landmark, which are set at the steps S49 and S51 is used only at the next execution of the step S31.

By performing the aforementioned processing, it is possible to set the inner dividing point of the segment connecting the vertex of the shape before the transformation (i.e. input shape or input shape after the previous transformation) and the boundary point in the target shape as the target landmark.

Returning to the explanation of FIG. 6, the transformation processing unit 103 determines m<N holds for the variable m (step S29). Here, N is a preset integer. When it is determined that m<N holds (step S29: Yes route), the processing returns to the processing of the step S25 in order to process the next vertex.

On the other hand, when it is determined that m<N does not hold for the variable m (step S29: No route), the transformation unit 1033 of the transformation processing unit 103 performs the transformation processing by the TPS Warp according to data of the pair of the source landmark and the target landmark, which are set for the same t and stored in the landmark data storage unit 104, and stores the shape data after the transformation in the transformed shape data storage unit 105 (step S31).

Figure 14:
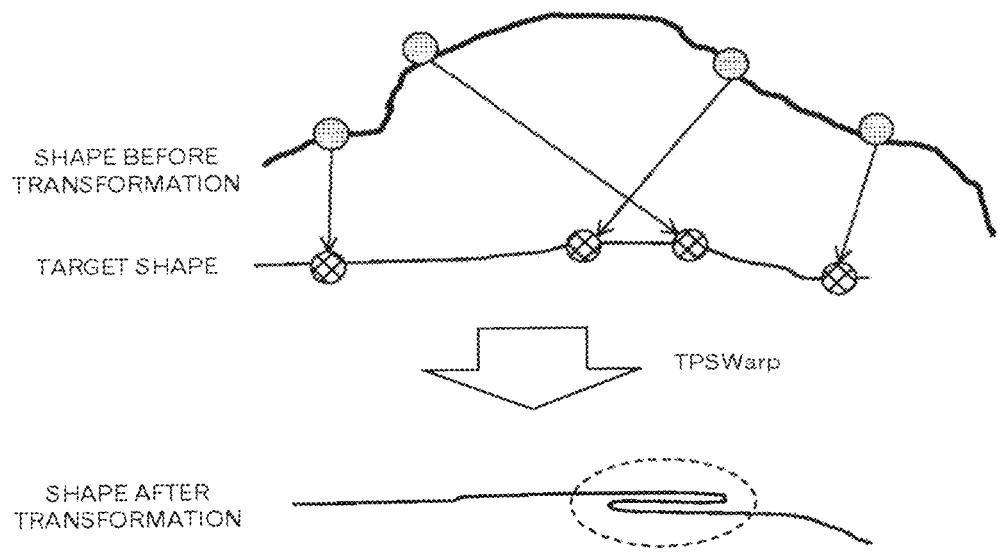
FIG. 14 is a diagram depicting a conventional problem.

As illustrated in FIG. 14, a method would be considered that the source landmark is placed in the shape before the transformation, the target landmark is placed at the cross point between the normal line at the source landmark and the target shape, and the transformation by the TPS Warp is performed. However, as illustrated in FIG. 14, when such a situation occurs that the normal lines cross each other, sometimes an unnatural shape, which is different from the target shape, is generated as the shape after the transformation.

Figure 15:
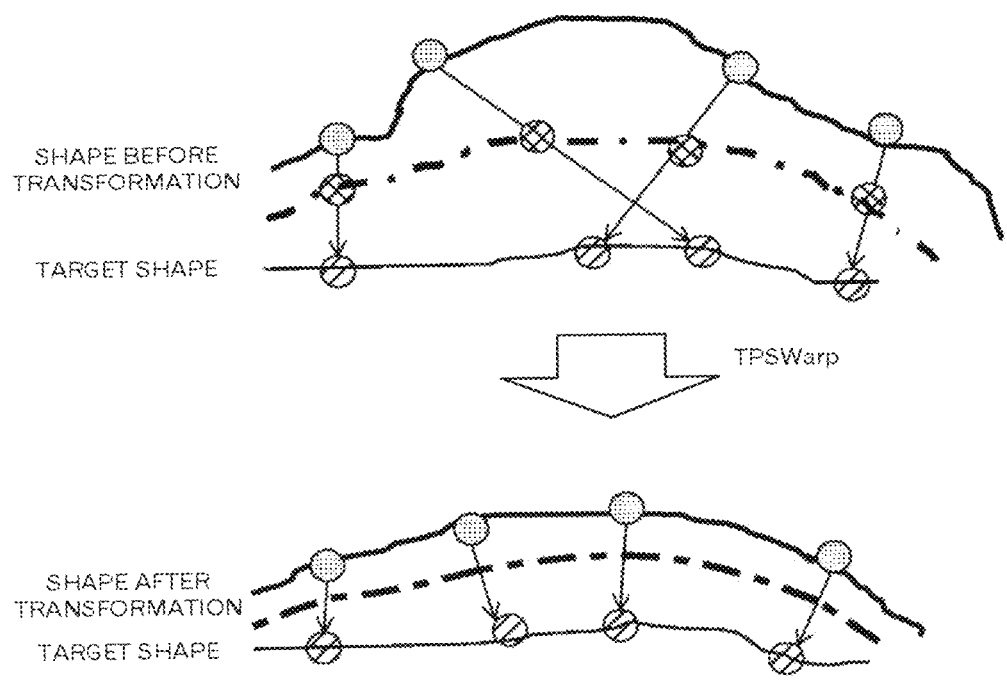
FIG. 15 is a diagram to explain a transformation processing in this embodiment.
Figure 16:
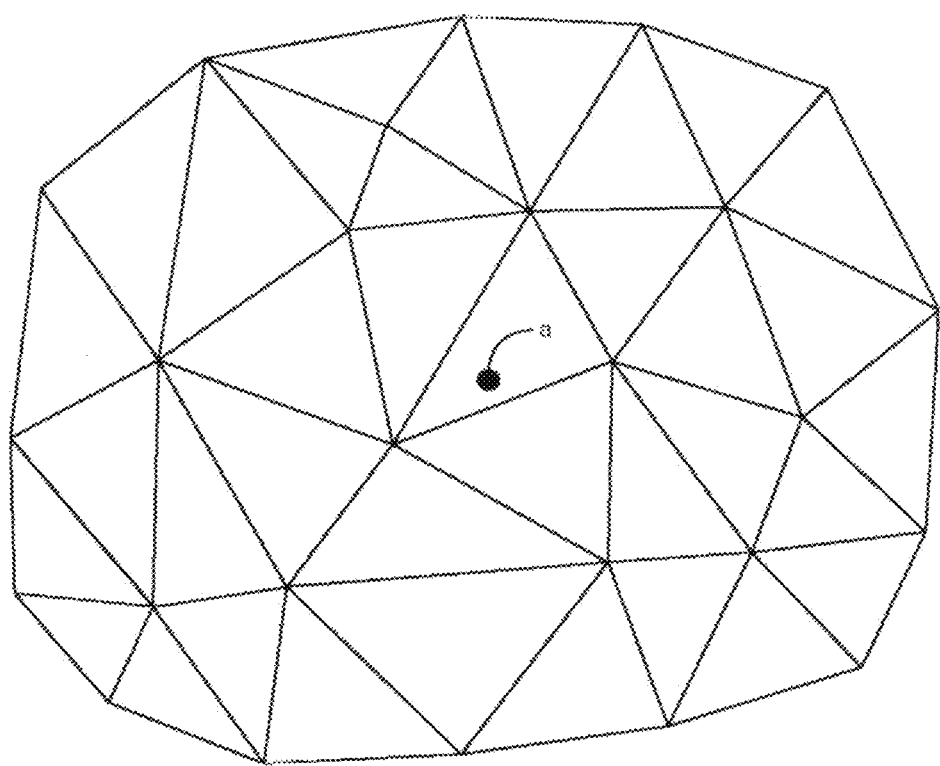
FIG. 16 is a diagram to explain Delaunay triangle division.
Figure 17:
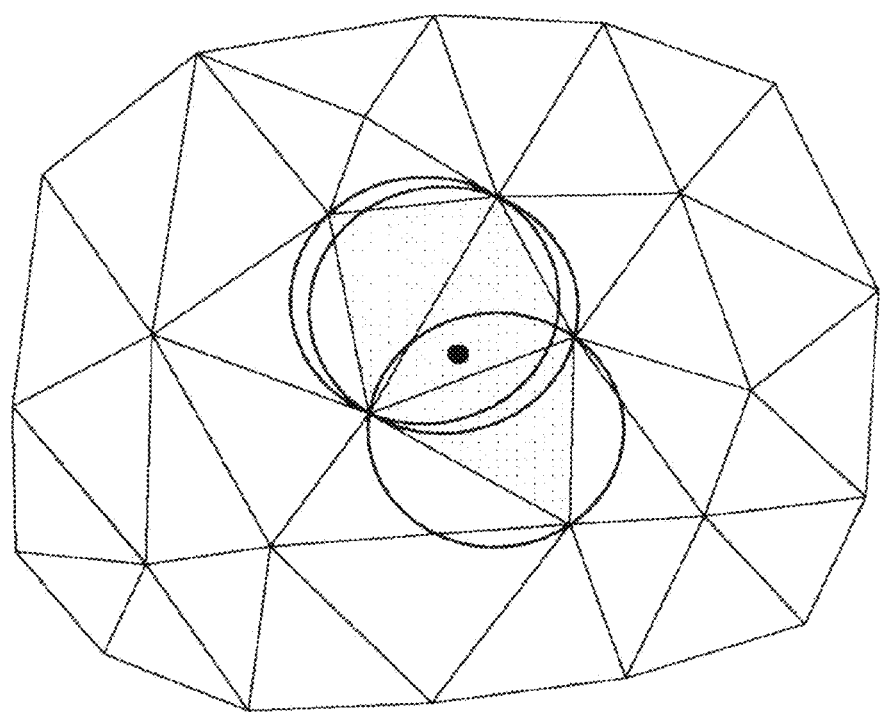
FIG. 17 is a diagram to explain Delaunay triangle division.
Figure 18:
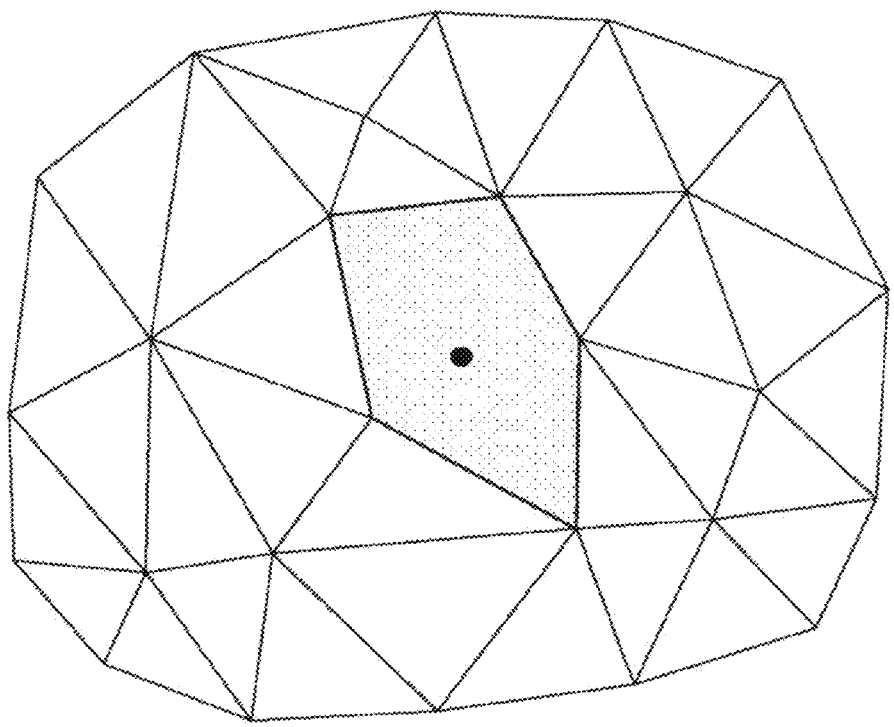
FIG. 18 is a diagram to explain Delaunay triangle division.

Then, in the transformation processing in this embodiment, as illustrated in FIG. 15, a target landmark (i.e. circle with the cross hatching) is placed at a point (a point on a dashed line), which inner-divides a segment connecting the source landmark (i.e. circle with hatching by dots) placed in the shape before the transformation with a crossing point between the normal line for the source landmark and the target shape, and then the transformation processing by the TPS Warp is performed. In addition, the source landmark (i.e. circle with hatching by dots) in the shape after the transformation, which was obtained in this transformation processing, is reset, and the target landmark is placed at a point that inner-divides a segment connecting the reset source landmark with a crossing point between the normal line for the source landmark and the target shape, and then the transformation processing by the TPS Warp is performed. By repeating that transformation processing, the shape is gradually brought close to the target shape. Thus, the unnatural shape is not caused easily in the shape after the transformation, and the direction of the normal line is likely to be faced toward a portion to be originally targeted. The internal ratio gradually increases, however, the distance between the source landmark and the target landmark is shortened. Therefore, appropriate transformation is performed.

Then, the mesh processing unit 1034 of the transformation processing unit 103 performs a remeshing processing for the shape data after the present transformation, which is stored in the transformed shape data storage unit 105, and stores processing results in the transformed shape data storage unit 105 (step S33).

Because deviation occurs in the shape of the mesh element when the target shape is complex, the remeshing processing is performed as a processing to subdivide mesh elements whose area exceeds a predetermined threshold and their surrounding mesh elements while repeating the transformation. By subdividing the mesh elements, it is possible to prevent phenomena such as a phenomenon that the aspect ratio becomes too bad to hold the smooth shape due to the deviation of the mesh shape. In addition, when the curved surface divided by the mesh elements are drawn, its accuracy depends on the fineness of the mesh elements (also called "mesh resolution"). Therefore, by performing the remeshing processing, it is possible to represent an arbitrary shape with high accuracy.

Especially, because a simple shape without any characteristic is used, the deviation occurs in the transformation, and as a result, unevenness of the mesh shape easily occurs. Therefore, as for the mesh elements whose size exceeds the size of the mesh element before the transformation, the inconvenience is resolved by dividing that mesh element and the like again.

Figure 19:
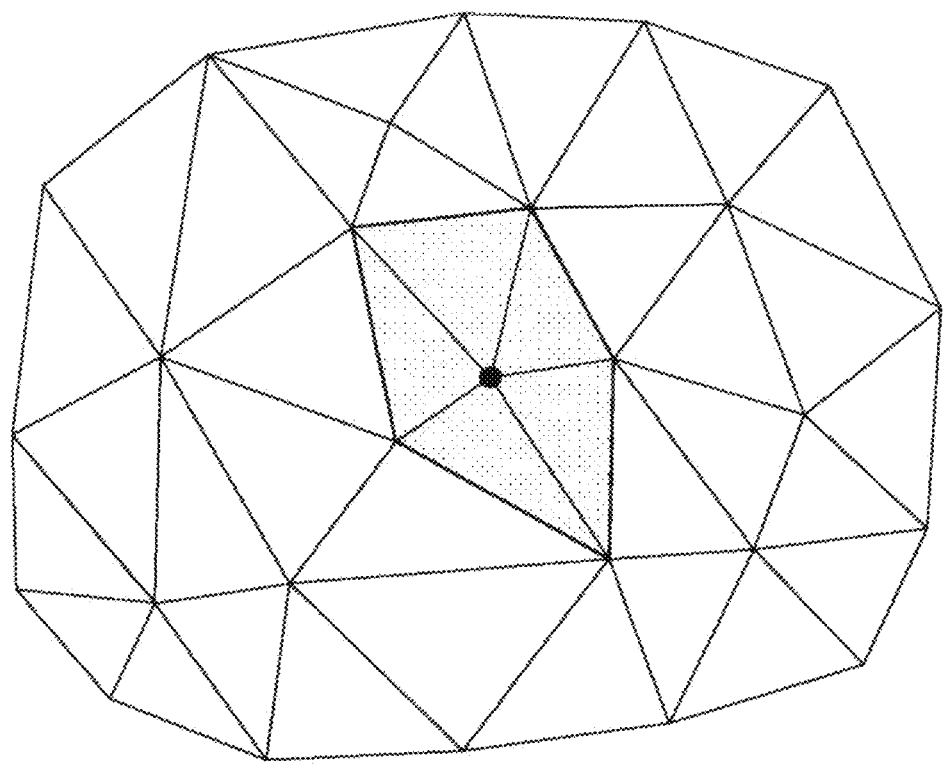
FIG. 19 is a diagram to explain Delaunay triangle division.

As the mesh dividing method in the remeshing processing, there are various methods such as octree mesh dividing method and Delaunay triangle division. The Delaunay triangle division is well-known, however as an example, it will be explained simply. Firstly, a new point a is added within a mesh element whose area exceeds a predetermined threshold. In an example of FIG. 16, the point a is set without any relationship with the area, however, the new point a is set within the mesh element whose area exceeds the predetermined threshold. Next, a circumscribed circle of each mesh element is drawn, and a mesh element whose circumscribed circle contains the point a is identified. In an example of FIG. 17, three mesh elements with hatching are identified. A polygon is generated by these mesh elements (FIG. 18), and the polygon is divided into triangles by vertices of this polygon and the point a (FIG. 19). When such a processing is performed, a triangle mesh is generated which includes triangles whose size is almost uniform.

Then, the transformation processing unit 103 determines whether or not t<T holds for the variable t (step S35). When it is determined that t<T holds (step S35: Yes route), the processing returns to the step S23 in order to further perform the transformation processing. T is the total number of times of the transformation, and is preset by an administrator or the like (e.g. T=500).

On the other hand, when it is determined that t<T does not hold for the variable t (step S35: No route), the processing returns to the calling-source processing, because the transformation is completed T times.

By performing the aforementioned processing, it becomes possible to obtain the three-dimensional shape data with high accuracy.

Figure 20:
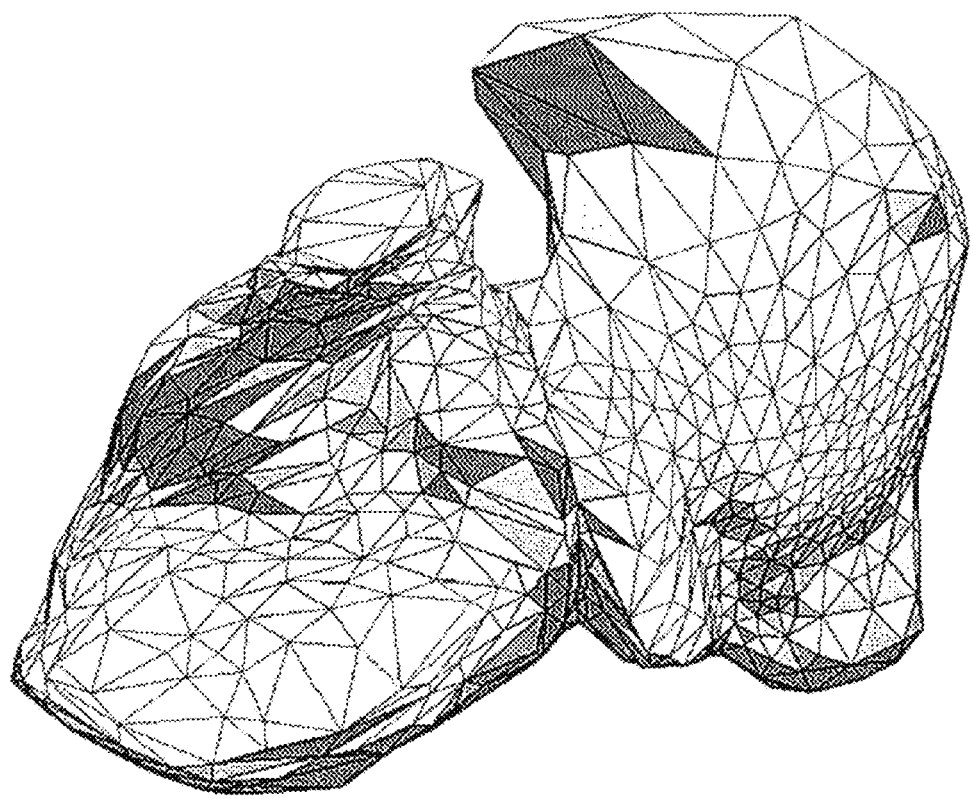
FIG. 20 is a diagram depicting an example of shape data in case where remeshing is not performed.
Figure 21:
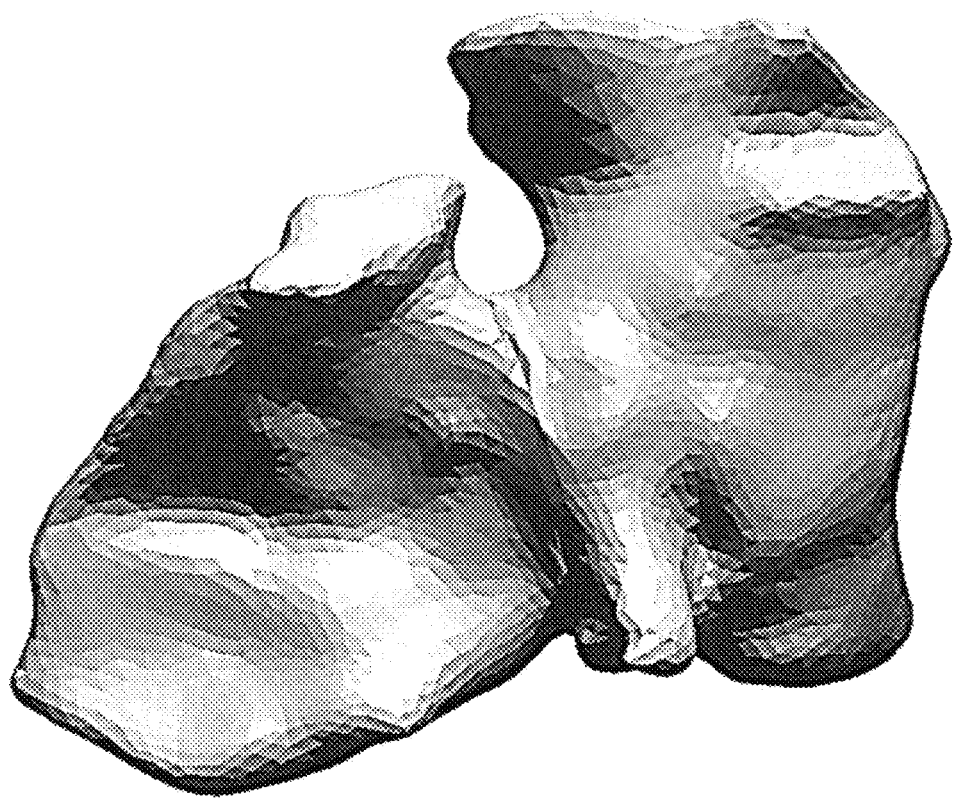
FIG. 21 is a diagram depicting an example of shape data in case where the remeshing is performed.

For example, when the remeshing processing at the step S33 is not performed, the three-dimensional shape data as illustrated in FIG. 20 is obtained. As understood from FIG. 20, the three-dimensional shape data whose sizes of the mesh elements are not uniform and that has low accuracy is obtained. On the other hand, when the remeshing processing at the step S33 is performed, the three-dimensional shape as illustrated in FIG. 21 is obtained. It can be understood that the three-dimensional shape data with fine triangular elements and high accuracy is obtained.

Embodiment 2

Figure 22:
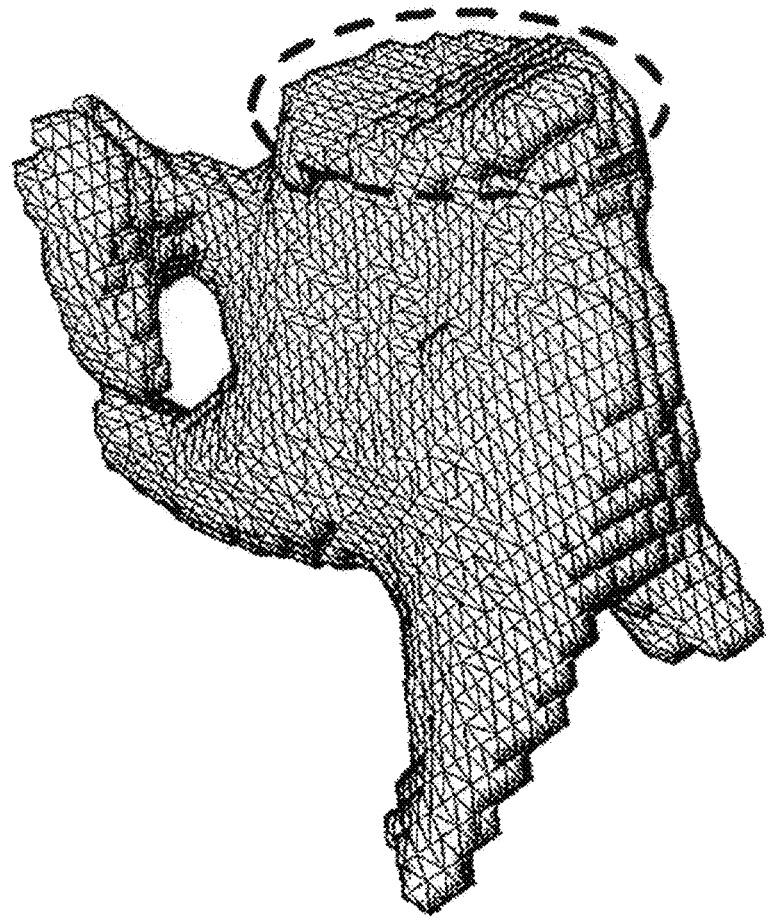
FIG. 22 is a diagram depicting an example of a target shape with an opening.

In this embodiment, a three-dimensional curved surface that has an opening is assumed as a target shape. Although there are some unclear portions, a target shape as illustrated in FIG. 22 is assumed. A portion surrounded by a dotted line in this target shape is the opening.

Figure 23:
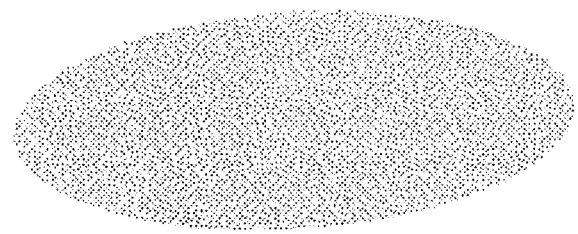
FIG. 23 is a diagram depicting an example of a disciform input shape.

In such a case, in this embodiment, a disciform input shape as illustrated in FIG. 23 is used, for example. In FIG. 23, it seems that the meshing is not performed, however, it is assumed that the meshing has been performed.

In such a case, a shape data generation apparatus 100 illustrated in FIG. 1 performs a processing as illustrated in FIGS. 24 to 29.

Figure 24:
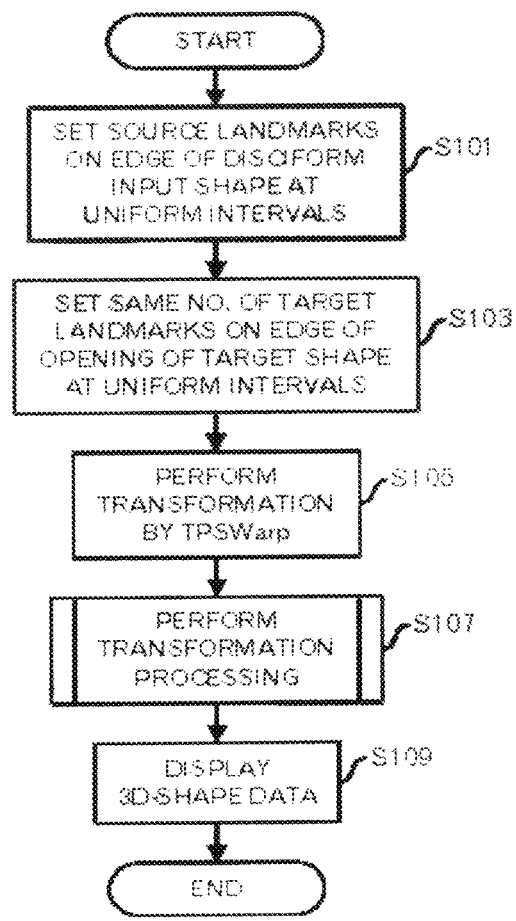
FIG. 24 is a diagram depicting a main processing flow relating to a second embodiment.
Figure 25:
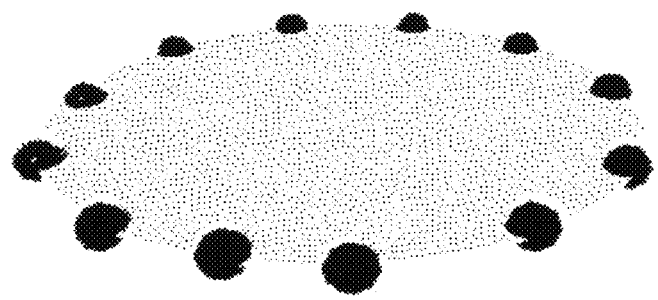
FIG. 25 is a diagram depicting an example where source landmarks are set for the input shape.

Firstly, when an instruction that represents the target shape is a three-dimensional curved surface with an opening is accepted via the input unit 108 from a user, the initial setting unit 1031 of the transformation processing unit 103 reads out data of the disciform input shape, which is stored in the input shape data storage unit 102, and sets source landmarks on an outer perimeter edge of the disc at uniform intervals (FIG. 24: step S101). For example, as schematically illustrated in FIG. 25, spherical source landmarks are set on the outer perimeter of the disc. As for the source landmarks, their vertex identifiers are stored in the landmark data storage unit 104. The source landmarks set at this step are handled as fixed points in the later processing.

Figure 26:
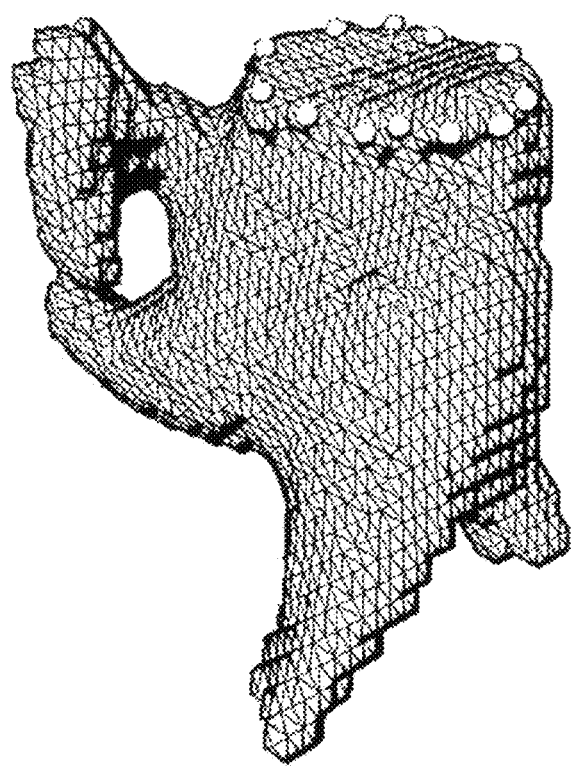
FIG. 26 is a diagram depicting an example where target landmarks are set for a target shape.

Furthermore, the initial setting unit 1031 identifies a target shape from the image data stored in the image data storage unit 101, and sets the same number of target landmarks as the number of source landmarks set for the input shape on an outer perimeter edge of an opening of the identified target shape at uniform intervals (step S103). As for the target landmarks, data of their vertex coordinates is stored in the landmark data storage unit 104. As schematically illustrated in FIG. 26, the same number of spherical target landmarks are set on the outer perimeter edge of the opening at uniform intervals.

Figure 27:
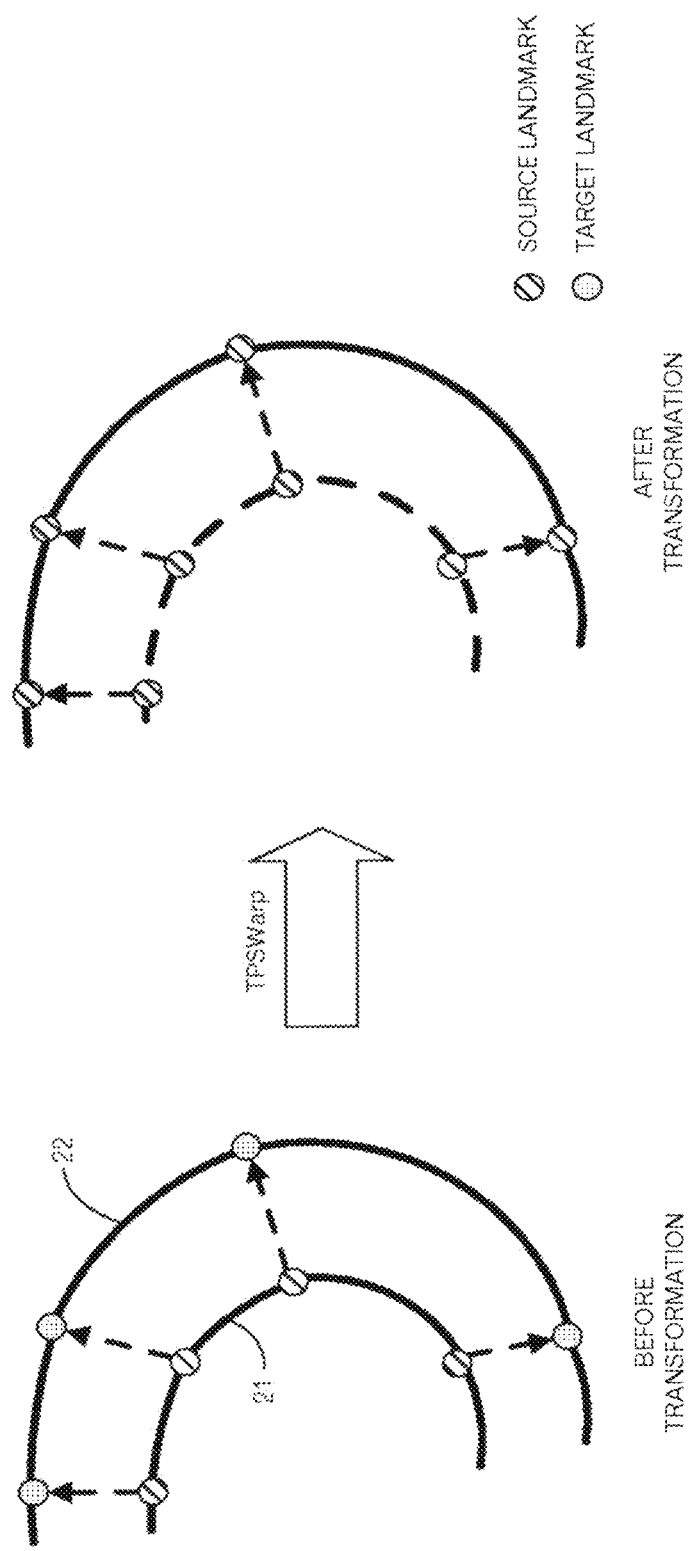
FIG. 27 is a diagram to explain a first transformation processing in the second embodiment.
Figure 28:
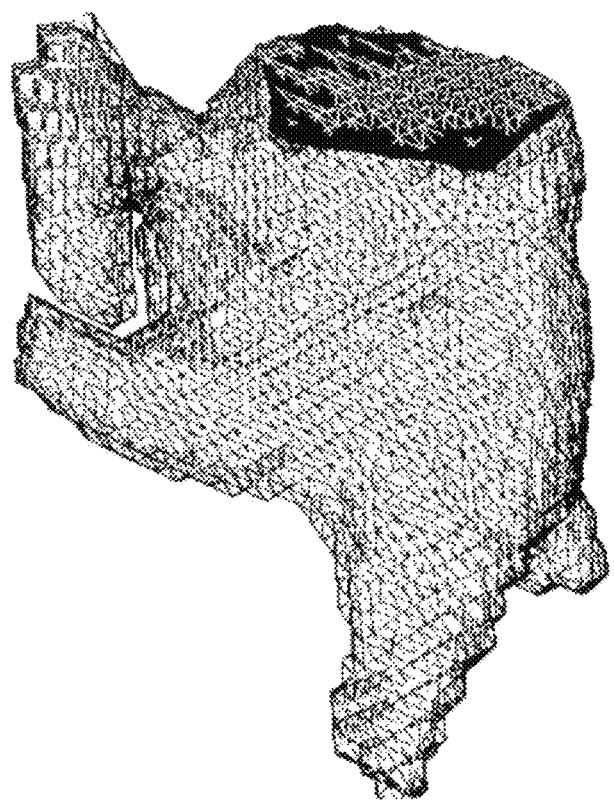
FIG. 28 is a diagram depicting a state after the first transformation processing in the second embodiment is performed.

Then, the initial setting unit 1031 causes the transformation unit 1033 to perform a transformation processing by TPS Warp so as to move the source landmarks to positions of the target landmarks, and stores the transformed shape data in the transformed shape data storage unit 105 (step S105). FIG. 27 illustrates this transformation processing, schematically. The left of FIG. 27 illustrates a state before the transformation, and the source landmarks placed on the outer perimeter edge 21 of the input shape at uniform intervals are moved toward the target landmarks located on the outer perimeter edge 22 of the opening of the target shape at uniform intervals once to transform the input shape. Then, as illustrated in the right of FIG. 27, the source landmarks are moved to the positions of the target landmarks, and other outer perimeter edge 21 of the input shape is transformed to be identical almost to the outer perimeter edge 22 of the opening of the target shape. In examples of FIGS. 25 and 26, a state schematically illustrated in FIG. 28 is obtained. In an example of FIG. 28, portions painted on the upper surface correspond to the input shape.

Then, the transformation processing unit 103 performs a transformation processing (step S107). The basic flow of the processing follows a processing illustrated in FIGS. 6 to 8. However, points different from the first embodiment are a point that the transformation processing has already been performed once, a point that the source landmarks has already been set, and a point the source landmarks are fixed points. As for the point that the transformation processing has already been performed once, the processing flow is different in a point that data of the input shape data after the previous transformation, which is stored in the transformed shape data storage unit 105, is used in the landmark setting processing even in case of t=1.

As for the point that the source landmarks have already been set, the processing flow is different in a point that the Euclid distance is calculated even initially at the step S43. As for the point that the source landmarks are fixed points, the processing flow is different in a point that the coordinate data of the fixed points is not changed in the transformation processing of the step S31.

The processing other than the aforementioned points are similar to that in the first embodiment.

Then, the output processing unit 106 performs a processing to display the transformed shape data stored in the transformed shape data storage unit 105 on the display unit 107 (step S109).

Figure 29:
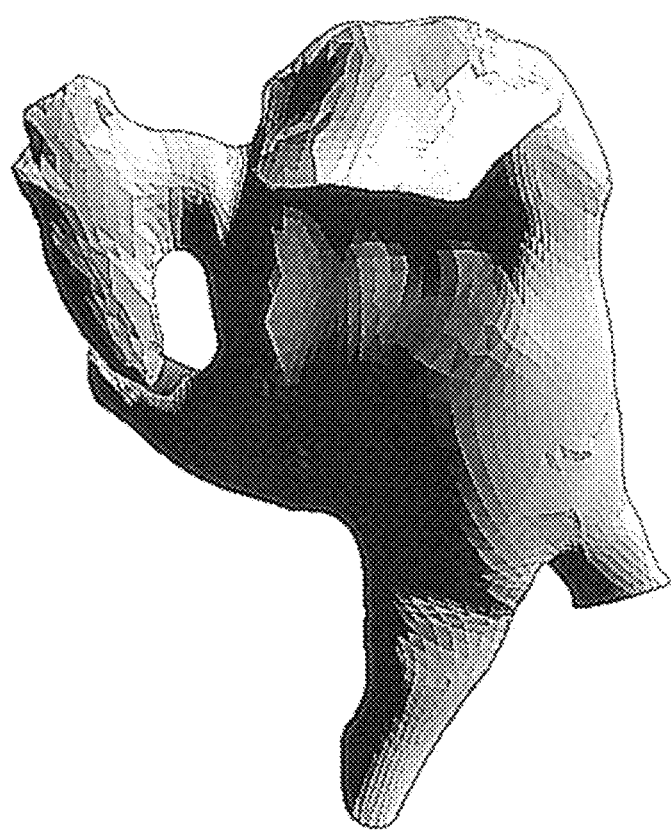
FIG. 29 is a diagram depicting an example of a processing result in the second embodiment.

For example, in the aforementioned example, a processing result as illustrated in FIG. 29 is obtained. In an example of FIG. 29, it can be understood that the shape data that is formed almost by uniform mesh elements is obtained.

Embodiment 3

Figure 30:
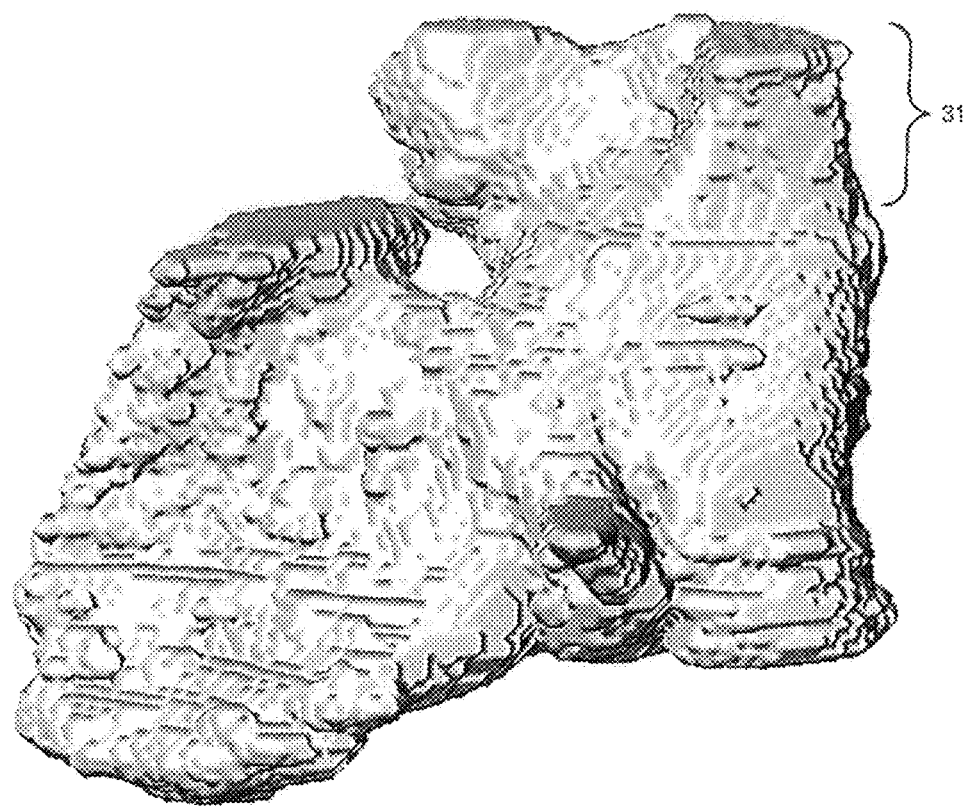
FIG. 30 is a diagram depicting a target shape in a third embodiment.

The atrium has more complex shape than the ventricle, because the ventricle is coupled to blood vessels such as the pulmonary vein and the vena cava. Then, as illustrated in FIG. 30, an example will be explained that a processing is performed using, as an example of the target shape, a shape that the vena cava 31 extends from the right atrium.

Figure 31:
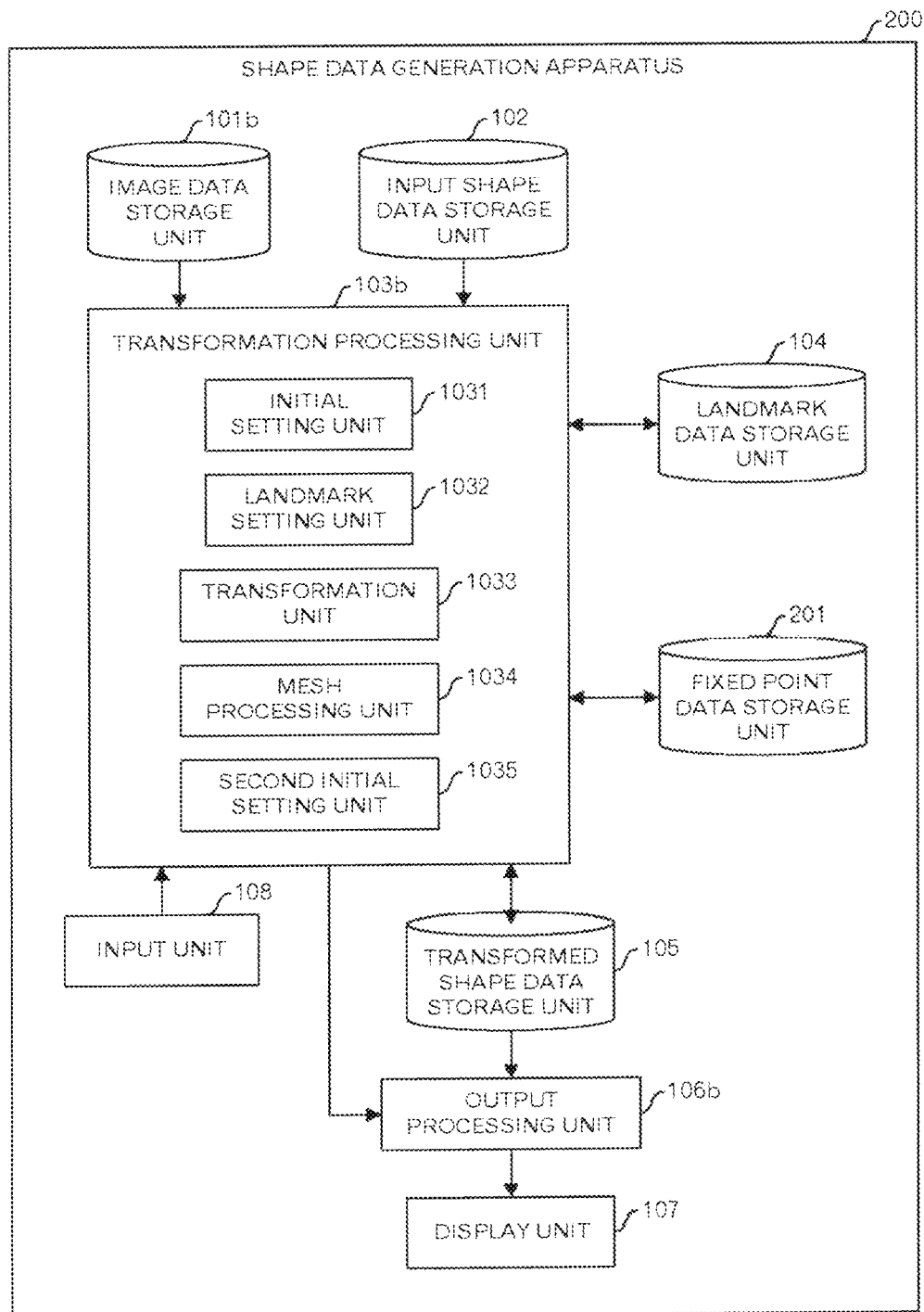
FIG. 31 is a functional block diagram of a shape data generation apparatus relating to the third embodiment.

A functional block diagram of a shape data generation apparatus 200 relating to this embodiment is illustrated in FIG. 31. In case where the shape data generation apparatus 200 has almost the same functions as those in the shape data generation apparatus 100 as illustrated in FIG. 1, the same reference symbols are attached. The shape data generation apparatus 200 has an image data storage unit 101b, an input shape data storage unit 102, a transformation processing unit 103b, a landmark data storage unit 104, a fixed point data storage unit 201, a transformed shape data storage unit 105, an output processing unit 106b, a display unit 107 and an input unit 108.

Both first segment image data only for the right atrium and second segment image data for the right atrium and the blood vessels are stored in the image data storage unit 101b.

The fixed point data storage unit 201 stores data of the fixed points set on the outer perimeter edge of the boundary portion between the transformed input shape obtained by performing the first transformation processing as described later and the blood vessels.

The output processing unit 106b may output the transformed input shape obtained by performing the first transformation processing on the display unit 107 in response to an instruction from the transformation processing unit 103b.

Furthermore, the transformation processing unit 103b has an initial setting unit 1031, a landmark setting unit 1032, a transformation unit 1033, a mesh processing unit 1034 and a second initial setting unit 1035. The second initial setting unit 1035 performs a setting processing that is performed before the second transformation processing.

Next, the processing relating to this embodiment will be explained by using FIGS. 32 to 37.

Figure 32:
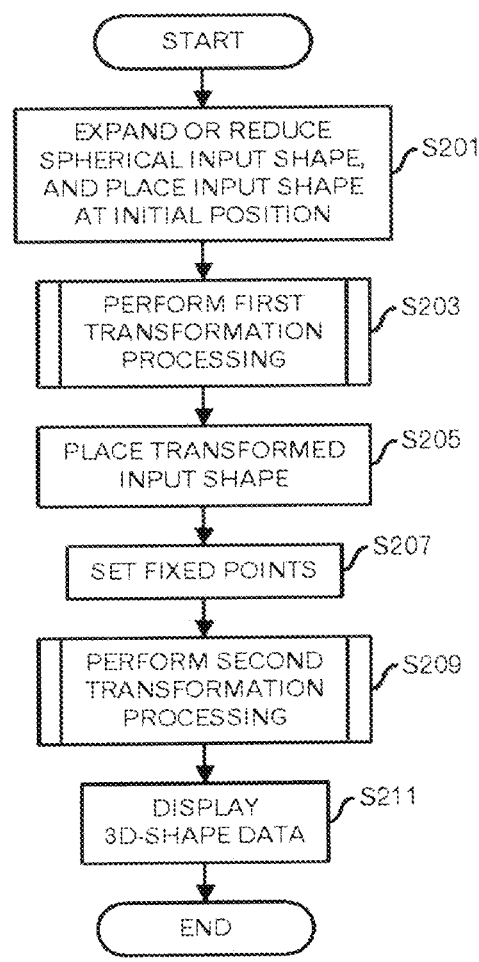
FIG. 32 is a diagram depicting a main processing flow relating to the third embodiment.

For example, when an instruction to start the processing relating to this embodiment is accepted via the input unit 108 from a user, the initial setting unit 1031 of the transformation processing unit 103b identifies a target shape such as the right atrium without the blood vessels or the like from the first segment image data stored in the image data storage unit 101b, reads out data of the spherical input shape from the input shape data storage unit 102, expands or reduces the input shape so as to match the input shape with the target shape, and places the input shape so that the center of gravity of the input shape is identical to the center of gravity of the target shape (FIG. 32: step S201). This step is similar to the processing at the step S1 in FIG. 4.

Next, the transformation processing unit 103b performs the first transformation processing, and stores the shape data after the completion of the transformation processing in the transformed shape data storage unit 105 (step S203). The first transformation processing is similar to that at the step S3 in FIG. 4, and the processing explained by using FIGS. 6 to 8 is performed.

Figure 33:
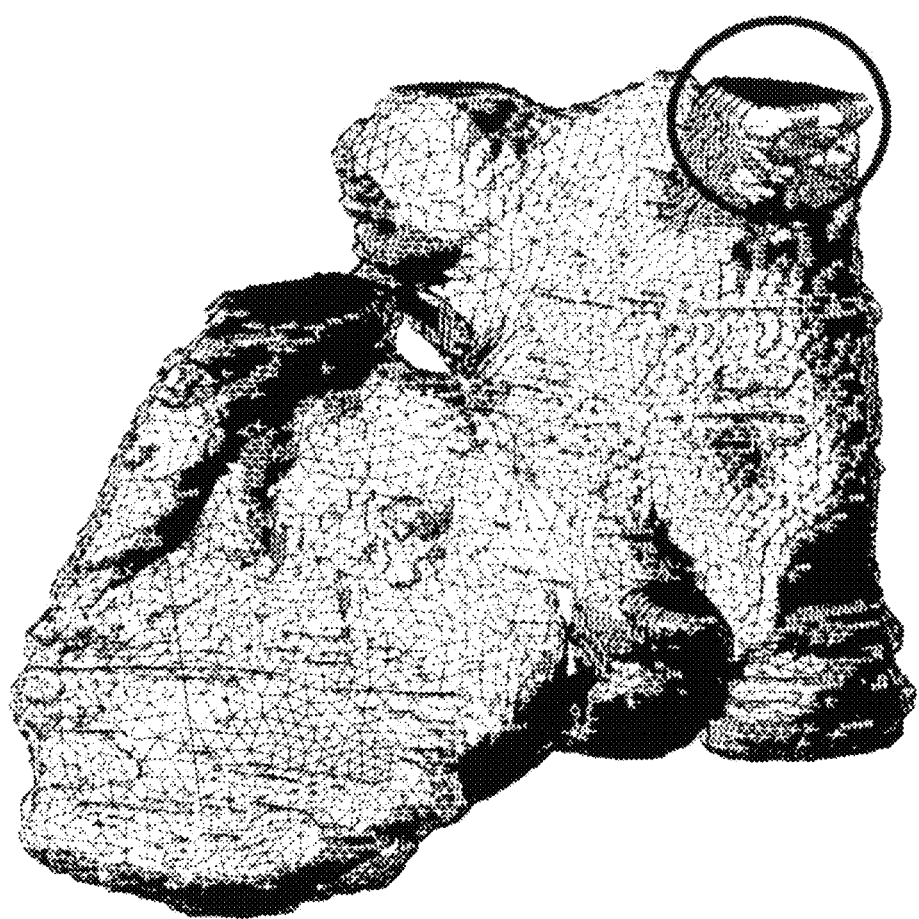
FIG. 33 is a diagram to explain a state before a second transformation processing in the third embodiment.

Next, the second initial setting unit 103S places the transformed input shape that is a processing result of the first transformation processing, which is stored in the transformed shape data storage unit 105, so that the transformed input shape is superimposed onto a second target shape including the right atrium and blood vessels, which are identified from the second segment image data stored in the image data storage unit 101b (step S205). The superimposed state is unclear, however, a state as illustrated in FIG. 33 is obtained. In FIG. 33, a portion surrounded by a circle represents a portion of the blood vessel, and this portion corresponds to a difference with the transformed input shape by the first transformation processing.

Then, the second initial setting unit 103S sets, in the transformed input shape, fixed points on the outer perimeter edge of the boundary surface between the transformed input shape and the second target shape, and stores data of the fixed points in the fixed point data storage unit 201 (step S207). For example, data of vertex identifiers of the fixed points are stored in the fixed point data storage unit 201.

Figure 34:
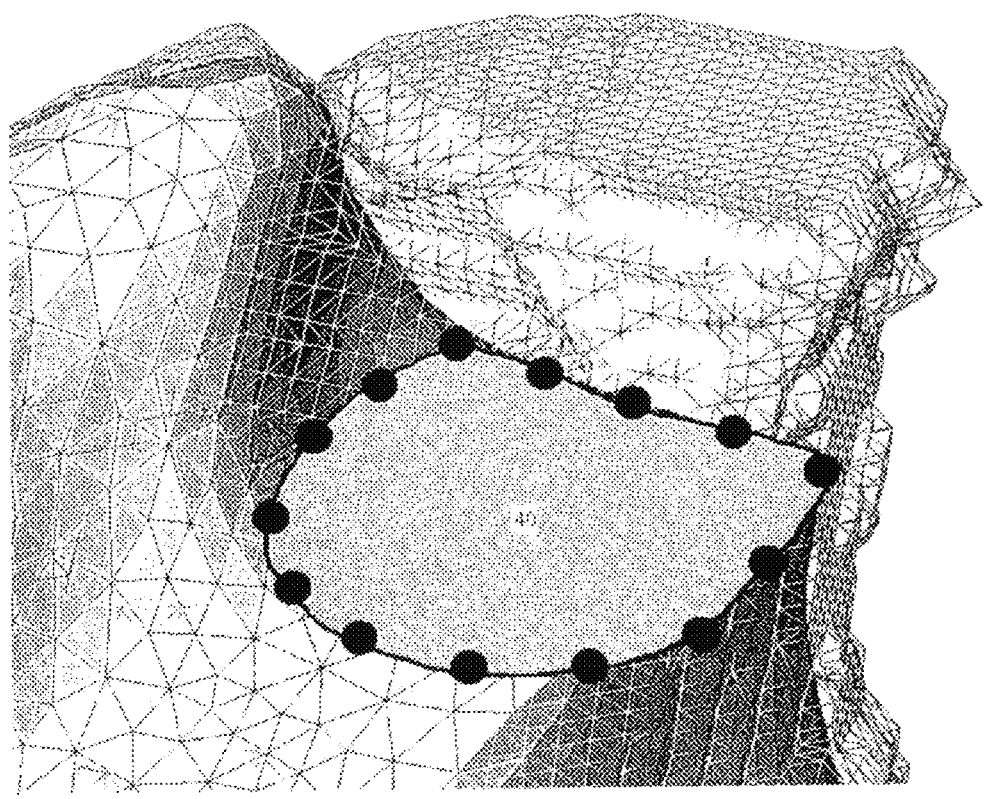
FIG. 34 is a diagram to explain the state before the second transformation processing in the third embodiment.
Figure 35:
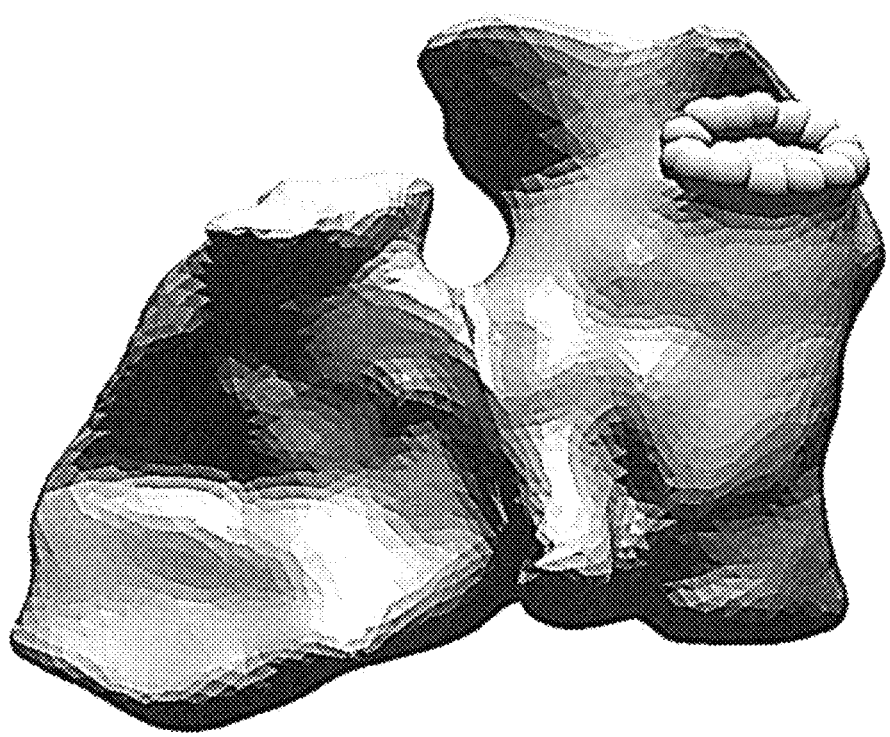
FIG. 35 is a diagram to explain the state before the second transformation processing in the third embodiment.

When a portion surrounded by a circle in FIG. 33 is expanded, a figure illustrated in FIG. 34 is obtained. In an example of FIG. 34, a boundary surface 40 between the transformed input shape and the second target shape is identified. Then, the fixed points illustrated by circles are set, for example, at uniform intervals, on the outer perimeter edge of this boundary surface 40. After the processing result of the first transformation processing, which is stored in the transformed shape data storage unit 105, and the second target shape are displayed on the display unit 107, the fixed points may be set by the user via the input unit 108. FIG. 35 illustrates an example of the transformed input shape for which the fixed points are set. The fixed points are represented by spheres highlighted in FIG. 35. The triangular mesh elements are formed on the internal surface, which is surrounded by the sphere.

Then, the transformation processing unit 103b performs a second transformation processing, and stores the processing result in the transformed shape data storage unit 105 (step S209). Basically, this processing is similar to the transformation processing relating to the first embodiment.

However, the fixed points stored in the fixed point data storage unit 201 are not moved. Therefore, at the step 331, positions of vertices whose identifiers are registered in the fixed point data storage unit 201 are not moved.

Then, the output processing unit 106b performs a processing to display the shape data after the transformation, which is stored in the transformed shape data storage unit 105, on the display unit 107 (step S211).

Figure 36:
FIG. 36 is a diagram depicting a processing result in the third embodiment.
Figure 37:
FIG. 37 is a diagram depicting a processing result in the third embodiment.

For example, a processing result as illustrated in FIG. 36 is obtained for the aforementioned example. In FIG. 36, the highlighted fixed points are still illustrated, however, actually the fixed points are not displayed. In other words, the three-dimensional shape data as illustrated in FIG. 37 is obtained as data of the input shape transformed by the second transformation processing.

Thus, even in case of the complex shape, it becomes possible to generate shape data with high accuracy.

Although the embodiments of this technique were explained, this technique is not limited to those embodiments. For example, the functional block diagrams illustrated in FIGS. 1 and 31 are mere examples, and may not correspond to an actual program module configuration.

Moreover, as for the processing flows, as long as the processing results do not change, the turns of the steps may be exchanged and plural steps may be executed in parallel.

Furthermore, in the aforementioned example, the heart, especially, the right atrium was explained as an example. However, even in case of another atrium, the ventricle of the heart or other organs, the similar processing can be applicable.

Figure 38:
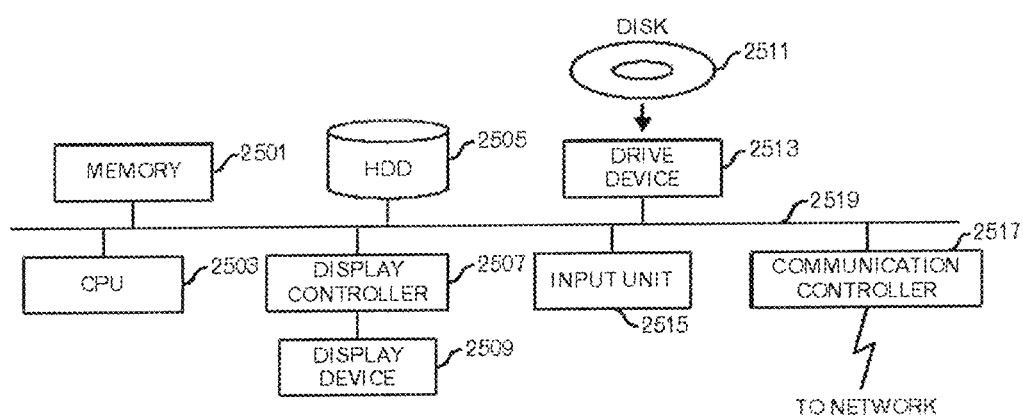
FIG. 38 is a functional block diagram of a computer.

In addition, the aforementioned shape data generation apparatuses 100 and 200 are computer devices as shown in FIG. 38. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as shown in FIG. 38. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The aforementioned embodiments are outlined as follows:

A shape data generation method relating to the embodiments includes: (A) setting an input shape for a target shape that is a shape of a transformation target identified from image data, wherein the input shape has a simple shape that has a same topology as the target shape; (B) identifying first vertices that satisfy a predetermined condition among plural vertices of the input shape, wherein the predetermined condition includes a first condition that a normal line of a certain vertex of the plural vertices crosses with the target shape; (C) first transforming the input shape so that a first vertex is moved in a direction of a normal line of the first vertex by a first distance that is shorter than a distance up to the target shape; and (D) performing the identifying and the first transforming a predetermined number of times while changing the input shape after the first transforming as the input shape to be processed.

By using such an input shape, it becomes possible to generate shape data having a similar shape to the target shape with high accuracy.

The first transforming may include performing a remeshing processing for a mesh element whose area exceeds a threshold and a surrounding mesh element among a plurality of mesh elements in the shape after the first transforming. By performing the remeshing processing, mesh elements having almost uniform size are generated. Therefore, it becomes possible to generate a smoothed shape. Especially, in case of the aforementioned input shape, the number of cases where ununiform mesh elements are generated increases. Therefore, this processing is effective in order to generate shape data with high accuracy.

Furthermore, the setting may include: when the target shape is a three-dimensional closed surface, reducing or expanding a spherical input shape in conformity with the target shape and placing the spherical input shape at a center of gravity of the target shape. By performing this processing, even in case of the three-dimensional closed surface, it is possible to perform a transformation processing, appropriately.

Moreover, the setting may include: when the target shape is a three-dimensional surface with an opening, second transforming a flat input shape in conformity with the opening. In such a case, the first transforming may include: fixing an edge portion of the flat input shape that was transformed in conformity with the opening. By performing this processing, it becomes possible to execute a transformation processing, appropriately, even in case of the three-dimensional surface having an opening.

Furthermore, this shape data generation method may further include: (E) placing a second input shape that is a shape obtained by the performing, for a second target shape that is identified from second image data and is a shape that an additional portion is attached to the targets shape, wherein fixed points that are not moved to an outer perimeter edge of a boundary surface with the additional portion are set in the second input shape; (F) second identifying second vertices that satisfy a second condition among plural vertices of the second input shape, wherein the second condition includes a condition that a normal line of a certain vertex of the plural vertices of the second input shape crosses with the second target shape; (G) second transforming the second input shape without the fixed points so that a second vertex is moved in a direction of a normal line of the second vertex by a second distance that is shorter than a distance up to the second target shape; and (H) performing the second identifying and the second transforming a second predetermined number of times while changing the second input shape after the second transforming as the second input shape to be processed.

When the shape data having a complex shape is generated, it becomes possible to generate the shape data with high accuracy when performing 2-stage transformation processing.

Furthermore, the aforementioned identifying or the second identifying may include: (X1) moving a vertex to be focused on in a direction of a normal line for the vertex to be focused on; first determining whether a point of a moving destination is included in a voxel space identified from the image data or the second image data; (X2) upon determining that the point of the moving destination is included in the voxel space, second determining whether the point of the moving destination passed through the input shape or the second input shape, based on an inner product of a normal vector for the vertex to be focused on and a normal vector for the point of the moving destination; (X3) upon determining that the point of the moving destination passed through the input shape, third determining whether a brightness value varied, by comparing a brightness value at the point of the moving destination with a brightness value at the vertex to be focused on; (X4) upon determining that the brightness value varied, fourth determining a condition is satisfied that the normal line for the vertex to be focused on crosses with the target shape or the second target shape; (X5) upon determining that the point of the moving destination is not included in the voxel space, or upon determining that the point of the moving destination passed through the input shape or the second input shape, fifth determining that a condition is not satisfied that the normal line for the vertex to be focused on crosses with the input shape or the second input shape; and (X6) upon determining that the brightness value does not vary, performing the first to fifth determining for the point of the moving destination again.

Thus, it is possible to determine whether or not the normal line for the first vertex crosses with the second shape, appropriately.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory such as ROM (Read Only Memory), and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable storage medium storing a program for causing a computer to execute a process, the process comprising:
    setting an input shape for a target shape that is a shape of a transformation target identified from image data, wherein the input shape has a simple shape that has a same topology as the target shape;
    identifying first vertices that satisfy a predetermined condition among a plurality of vertices of the input shape, wherein the predetermined condition includes a first condition that a normal line of a certain vertex of the plurality of vertices crosses with the target shape;
    first transforming the input shape so that a first vertex is moved in a direction of a normal line of the first vertex by a first distance that is shorter than a distance up to the target shape; and
    performing the identifying and the first transforming a predetermined number of times while changing the input shape after the first transforming as the input shape to be processed, wherein
    the setting comprises upon detecting that the target shape is a three-dimensional surface with an opening, second transforming a flat input shape in conformity with the opening, and
    the first transforming comprises fixing an edge portion of the flat input shape that was transformed in conformity with the opening.

2. The non-transitory computer-readable storage medium as set forth in claim 1, wherein the first transforming comprises performing a remeshing processing for a mesh element whose area exceeds a threshold and a surrounding mesh element among a plurality of mesh elements in the shape after the first transforming.

3. The non-transitory computer-readable storage medium as set forth in claim 1, wherein the setting comprises upon detecting that the target shape is a three-dimension closed surface, reducing or expanding a spherical input shape in conformity with the target shape and placing the spherical input shape at a center of gravity of the target shape.

4. The non-transitory computer-readable storage medium as set forth in claim 1, wherein the process further comprises:
    placing a second input shape that is a shape obtained by the performing, for a second target shape that is identified from second image data and is a shape that an additional portion is attached to the targets shape, wherein fixed points that are not moved to an outer perimeter edge of a boundary surface with the additional portion are set in the second input shape;
    second identifying second vertices that satisfy a second condition among a plurality of vertices of the second input shape, wherein the second condition includes a condition that a normal line of a certain vertex of the plurality of vertices of the second input shape crosses with the second target shape;
    second transforming the second input shape without the fixed points so that a second vertex is moved in a direction of a normal of the second vertex by a second distance that is shorter than a distance up to the second target shape; and
    performing the second identifying and the second transforming a second predetermined number of times while changing the second input shape after the second transforming as the second input shape to be processed.

5. The non-transitory computer-readable storage medium as set forth in claim 1, wherein the identifying comprises:
    moving a vertex to be focused on in a direction of a normal line for the vertex to be focused on;
    first determining whether a point of a moving destination is included in a voxel space identified from the image data;
    upon determining that the point of the moving destination is included in the voxel space, second determining whether the point of the moving destination passed through the input shape, based on an inner product of a normal vector for the vertex to be focused on and a normal vector for the point of the moving destination;
    upon determining that the point of the moving destination passed through the input shape, third determining whether a brightness value varied, by comparing a brightness value at the point of the moving destination with a brightness value at the vertex to be focused on;
    upon determining that the brightness value varied, fourth determining a condition is satisfied that the normal line for the vertex to be focused on crosses with the target shape;
    upon determining that the point of the moving destination is not included in the voxel space, or upon determining that the point of the moving destination passed through the input shape, fifth determining that a condition is not satisfied that the normal line for the vertex to be focused on crosses with the input shape; and
    upon determining that the brightness value does not vary, performing the first to fifth determining for the point of the moving destination again.

6. A shape data generation method, comprising:
    setting, by using a computer, an input shape for a target shape that is a shape of a transformation target identified from image data, wherein the input shape has a simple shape that has a same topology as the target shape;
    identifying, by using the computer, first vertices that satisfy a predetermined condition among a plurality of vertices of the input shape, wherein the predetermined condition includes a first condition that a normal line of a certain vertex of the plurality of vertices crosses with the target shape;
    transforming, by using the computer, the input shape so that a first vertex is moved in a direction of a normal line of the first vertex by a first distance that is shorter than a distance up to the target shape; and
    performing, by using the computer, the identifying and the transforming a predetermined number of times while changing the input shape after the transforming as the input shape to be processed, wherein
    the setting comprises upon detecting that the target shape is a three-dimensional surface with an opening, second transforming a flat input shape in conformity with the opening, and
    the first transforming comprises fixing an edge portion of the flat input shape that was transformed in conformity with the opening.

7. A shape data generation apparatus, comprising:
    a memory; and
    a processor configured to use the memory and execute a process, the process comprising:
    setting an input shape for a target shape that is a shape of a transformation target identified from image data, wherein the input shape has a simple shape that has a same topology as the target shape;
    identifying first vertices that satisfy a predetermined condition among a plurality of vertices of the input shape, wherein the predetermined condition includes a first condition that a normal line of a certain vertex of the plurality of vertices crosses with the target shape;
    transforming the input shape so that a first vertex is moved in a direction of a normal line of the first vertex by a first distance that is shorter than a distance up to the target shape; and
    performing the identifying and the transforming a predetermined number of times while changing the input shape after the transforming as the input shape to be processed, wherein
    the setting comprises upon detecting that the target shape is a three-dimensional surface with an opening, second transforming a flat input shape in conformity with the opening, and
    the first transforming comprises fixing an edge portion of the flat input shape that was transformed in conformity with the opening.

* * * * *